(12) United States Patent
Nelson et al.

(10) Patent No.: US 9,027,321 B2
(45) Date of Patent: May 12, 2015

(54) LOW EMISSION POWER GENERATION AND HYDROCARBON RECOVERY SYSTEMS AND METHODS

(75) Inventors: Eric D Nelson, Stavanger (NO); Moses Minta, Missouri City, TX (US); Loren K Starcher, Sugar Land, TX (US); Franklin Mittricker, Jamul, CA (US); Omar Angus Sites, Spring, TX (US); Jasper L Dickson, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 376 days.

(21) Appl. No.: 13/503,926
(22) PCT Filed: Sep. 17, 2010
(86) PCT No.: PCT/US2010/049279
§ 371 (c)(1),
(2), (4) Date: Jun. 12, 2012
(87) PCT Pub. No.: WO2011/059567
PCT Pub. Date: May 19, 2011

(65) Prior Publication Data
US 2012/0247105 A1    Oct. 4, 2012

Related U.S. Application Data
(60) Provisional application No. 61/260,636, filed on Nov. 12, 2009.

(51) Int. Cl.
*F02C 6/00* (2006.01)
*E21B 43/40* (2006.01)
(Continued)

(52) U.S. Cl.
CPC ............ *E21B 43/40* (2013.01); *F01K 23/10* (2013.01); *Y02E 20/16* (2013.01); *F01K 23/068* (2013.01); *Y02E 20/18* (2013.01)

(58) Field of Classification Search
CPC ..... F01K 23/067; F01K 23/068; F01K 23/02; F01K 23/04; F01K 23/06; F01K 23/064; Y02E 20/14; Y02E 20/16; Y02E 20/18; Y02E 20/185; Y02E 20/322; Y02E 20/324; Y02E 20/326; Y02E 20/344; Y02E 20/36; F02C 3/28; F02C 3/30; F02C 3/34; F02C 6/04; F02C 6/10; F02C 6/18; F02C 6/224; F02C 7/224

USPC ........... 60/39.01, 780, 39.12, 39.182, 39.183, 60/39.463, 39.465, 39.5, 39.55, 726, 643, 60/698, 775, 781, 783, 784; 48/89

See application file for complete search history.

(56) References Cited

U.S. PATENT DOCUMENTS

| 2,488,911 | A | 11/1949 | Hepburn et al. |
|---|---|---|---|
| 2,884,758 | A | 5/1959 | Oberle |

(Continued)

FOREIGN PATENT DOCUMENTS

| CA | 2231749 | 9/1998 |
|---|---|---|
| CA | 2645450 | 9/2007 |

(Continued)

OTHER PUBLICATIONS

A. Lager et al., Low Salinity Oil Recovery—An Experimental Investigation, Sep. 12, 2006, p. 1. Located at: http://www.scaweb.org/assets/papers/2006_papers/SCA2006-36.pdf.*

(Continued)

*Primary Examiner* — Hoang Nguyen
(74) *Attorney, Agent, or Firm* — ExxonMobil Upstream Research Company Law Department

(57) ABSTRACT

Integrated systems and methods for low emission power generation in a hydrocarbon recovery processes are provided. One system includes a control fuel stream, an oxygen stream, a combustion unit, a first power generate on system and a second power generation system. The combustion unit is configured to receive and combust the control fuel stream and the oxygen stream to produce a gaseous combustion stream having carbon dioxide and water. The first power generation system is configured to generate at least one unit of power and a carbon dioxide stream. The second power generation system is configured to receive thermal energy from the gaseous combustion stream and convert the thermal energy into at least one unit of power.

32 Claims, 6 Drawing Sheets

(51) Int. Cl.
*F01K 23/10* (2006.01)
*F01K 23/06* (2006.01)

(56) References Cited

U.S. PATENT DOCUMENTS

| | | |
|---|---|---|
| 3,631,672 A | 1/1972 | Gentile et al. |
| 3,643,430 A | 2/1972 | Emory et al. |
| 3,705,492 A | 12/1972 | Vickers |
| 3,841,382 A | 10/1974 | Gravis et al. |
| 3,949,548 A | 4/1976 | Lockwood |
| 4,018,046 A | 4/1977 | Hurley |
| 4,043,395 A | 8/1977 | Every et al. |
| 4,050,239 A | 9/1977 | Kappler et al. |
| 4,066,214 A | 1/1978 | Johnson |
| 4,077,206 A | 3/1978 | Ayyagari |
| 4,085,578 A | 4/1978 | Kydd |
| 4,092,095 A | 5/1978 | Straitz |
| 4,101,294 A | 7/1978 | Kimura |
| 4,112,676 A | 9/1978 | DeCorso |
| 4,117,671 A | 10/1978 | Neal et al. |
| 4,160,640 A | 7/1979 | Maev et al. |
| 4,165,609 A | 8/1979 | Rudolph |
| 4,171,349 A | 10/1979 | Cucuiat et al. |
| 4,204,401 A | 5/1980 | Earnest |
| 4,222,240 A | 9/1980 | Castellano |
| 4,224,991 A | 9/1980 | Sowa et al. |
| 4,236,378 A | 12/1980 | Vogt |
| 4,253,301 A | 3/1981 | Vogt |
| 4,271,664 A | 6/1981 | Earnest |
| 4,344,486 A | 8/1982 | Parrish |
| 4,345,426 A | 8/1982 | Egnell et al. |
| 4,352,269 A | 10/1982 | Dineen |
| 4,380,895 A | 4/1983 | Adkins |
| 4,399,652 A | 8/1983 | Cole et al. |
| 4,414,334 A | 11/1983 | Hitzman |
| 4,434,613 A | 3/1984 | Stahl |
| 4,435,153 A | 3/1984 | Hashimoto et al. |
| 4,442,665 A | 4/1984 | Fick et al. |
| 4,445,842 A | 5/1984 | Syska |
| 4,479,484 A | 10/1984 | Davis |
| 4,480,985 A | 11/1984 | Davis |
| 4,488,865 A | 12/1984 | Davis |
| 4,498,288 A | 2/1985 | Vogt |
| 4,498,289 A | 2/1985 | Osgerby |
| 4,528,811 A | 7/1985 | Stahl |
| 4,543,784 A | 10/1985 | Kirker |
| 4,548,034 A | 10/1985 | Maguire |
| 4,561,245 A | 12/1985 | Ball |
| 4,569,310 A | 2/1986 | Davis |
| 4,577,462 A | 3/1986 | Robertson |
| 4,602,614 A | 7/1986 | Percival et al. |
| 4,606,721 A | 8/1986 | Livingston |
| 4,613,299 A | 9/1986 | Backheim |
| 4,637,792 A | 1/1987 | Davis |
| 4,651,712 A | 3/1987 | Davis |
| 4,653,278 A | 3/1987 | Vinson et al. |
| 4,681,678 A | 7/1987 | Leaseburge et al. |
| 4,684,465 A | 8/1987 | Leaseburge et al. |
| 4,753,666 A | 6/1988 | Pastor et al. |
| 4,762,543 A | 8/1988 | Pantermuehl et al. |
| 4,817,387 A | 4/1989 | Lashbrook |
| 4,858,428 A | 8/1989 | Paul |
| 4,895,710 A | 1/1990 | Hartmann et al. |
| 4,898,001 A | 2/1990 | Kuroda et al. |
| 4,946,597 A | 8/1990 | Sury |
| 4,976,100 A | 12/1990 | Lee |
| 5,014,785 A | 5/1991 | Puri et al. |
| 5,044,932 A | 9/1991 | Martin et al. |
| 5,073,105 A | 12/1991 | Martin et al. |
| 5,084,438 A | 1/1992 | Matsubara et al. |
| 5,085,274 A | 2/1992 | Puri et al. |
| 5,098,282 A | 3/1992 | Schwartz et al. |
| 5,123,248 A | 6/1992 | Monty et al. |
| 5,135,387 A | 8/1992 | Martin et al. |
| 5,141,049 A | 8/1992 | Larsen et al. |
| 5,142,866 A | 9/1992 | Yanagihara et al. |
| 5,147,111 A | 9/1992 | Montgomery |
| 5,154,596 A | 10/1992 | Schwartz et al. |
| 5,183,232 A | 2/1993 | Gale |
| 5,195,884 A | 3/1993 | Schwartz et al. |
| 5,197,289 A | 3/1993 | Glevicky et al. |
| 5,238,395 A | 8/1993 | Schwartz et al. |
| 5,255,506 A | 10/1993 | Wilkes et al. |
| 5,255,507 A * | 10/1993 | Gounder ............. 60/39.12 |
| 5,265,410 A | 11/1993 | Hisatome |
| 5,271,905 A | 12/1993 | Owen et al. |
| 5,275,552 A | 1/1994 | Schwartz et al. |
| 5,295,350 A | 3/1994 | Child et al. |
| 5,304,362 A | 4/1994 | Madsen |
| 5,325,660 A | 7/1994 | Taniguchi et al. |
| 5,332,036 A | 7/1994 | Shirley et al. |
| 5,344,307 A | 9/1994 | Schwartz et al. |
| 5,345,756 A | 9/1994 | Jahnke et al. |
| 5,355,668 A | 10/1994 | Weil et al. |
| 5,359,847 A | 11/1994 | Pillsbury et al. |
| 5,361,586 A | 11/1994 | McWhirter et al. |
| 5,388,395 A * | 2/1995 | Scharpf et al. ............ 60/781 |
| 5,394,688 A | 3/1995 | Amos |
| 5,402,847 A | 4/1995 | Wilson et al. |
| 5,444,971 A | 8/1995 | Holenberger |
| 5,457,951 A | 10/1995 | Johnson et al. |
| 5,458,481 A | 10/1995 | Surbey et al. |
| 5,468,270 A | 11/1995 | Borszynski |
| 5,490,378 A | 2/1996 | Berger et al. |
| 5,542,840 A | 8/1996 | Surbey et al. |
| 5,566,756 A | 10/1996 | Chaback et al. |
| 5,572,862 A | 11/1996 | Mowill |
| 5,581,998 A | 12/1996 | Craig |
| 5,584,182 A | 12/1996 | Althaus et al. |
| 5,590,518 A | 1/1997 | Janes |
| 5,628,182 A | 5/1997 | Mowill |
| 5,634,329 A | 6/1997 | Andersson et al. |
| 5,638,675 A | 6/1997 | Zysman et al. |
| 5,640,840 A | 6/1997 | Briesch |
| 5,657,631 A | 8/1997 | Androsov |
| 5,680,764 A | 10/1997 | Viteri |
| 5,685,158 A | 11/1997 | Lenahan et al. |
| 5,709,077 A | 1/1998 | Beichel |
| 5,713,206 A | 2/1998 | McWhirter et al. |
| 5,715,673 A | 2/1998 | Beichel |
| 5,724,805 A | 3/1998 | Golomb et al. |
| 5,725,054 A | 3/1998 | Shayegi et al. |
| 5,740,786 A | 4/1998 | Gartner |
| 5,743,079 A | 4/1998 | Walsh et al. |
| 5,765,363 A | 6/1998 | Mowill |
| 5,771,867 A | 6/1998 | Amstutz et al. |
| 5,771,868 A | 6/1998 | Khair |
| 5,819,540 A | 10/1998 | Massarani |
| 5,832,712 A | 11/1998 | Ronning et al. |
| 5,836,164 A | 11/1998 | Tsukahara et al. |
| 5,839,283 A | 11/1998 | Dobbeling |
| 5,850,732 A | 12/1998 | Willis et al. |
| 5,894,720 A | 4/1999 | Willis et al. |
| 5,901,547 A | 5/1999 | Smith et al. |
| 5,924,275 A | 7/1999 | Cohen et al. |
| 5,930,990 A | 8/1999 | Zachary et al. |
| 5,937,634 A | 8/1999 | Etheridge et al. |
| 5,950,417 A | 9/1999 | Robertson et al. |
| 5,956,937 A | 9/1999 | Beichel |
| 5,968,349 A | 10/1999 | Duyvesteyn et al. |
| 5,974,780 A | 11/1999 | Santos |
| 5,992,388 A | 11/1999 | Seger |
| 6,016,658 A | 1/2000 | Willis et al. |
| 6,032,465 A | 3/2000 | Regnier |
| 6,035,641 A | 3/2000 | Lokhandwala |
| 6,062,026 A | 5/2000 | Woollenweber et al. |
| 6,065,283 A * | 5/2000 | Shouman ............. 60/39.182 |
| 6,079,974 A | 6/2000 | Thompson |
| 6,082,093 A | 7/2000 | Greenwood et al. |
| 6,089,855 A | 7/2000 | Becker et al. |
| 6,094,916 A | 8/2000 | Puri et al. |
| 6,101,983 A | 8/2000 | Anand et al. |
| 6,148,602 A | 11/2000 | Demetri |
| 6,170,264 B1 | 1/2001 | Viteri et al. |

(56) References Cited

U.S. PATENT DOCUMENTS

| | | |
|---|---|---|
| 6,183,241 B1 | 2/2001 | Bohn et al. |
| 6,201,029 B1 | 3/2001 | Waycuilis |
| 6,202,400 B1 | 3/2001 | Utamura et al. |
| 6,202,442 B1 | 3/2001 | Brugerolle |
| 6,202,574 B1 | 3/2001 | Liljedahl et al. |
| 6,209,325 B1 | 4/2001 | Alkabie |
| 6,216,459 B1 | 4/2001 | Daudel et al. |
| 6,216,549 B1 | 4/2001 | Davis et al. |
| 6,230,103 B1 | 5/2001 | DeCorso et al. |
| 6,237,339 B1 | 5/2001 | Åsen et al. |
| 6,247,315 B1 | 6/2001 | Marin et al. |
| 6,247,316 B1 | 6/2001 | Viteri |
| 6,248,794 B1 | 6/2001 | Gieskes |
| 6,253,555 B1 | 7/2001 | Willis |
| 6,256,976 B1 | 7/2001 | Kataoka et al. |
| 6,256,994 B1 | 7/2001 | Dillon, IV |
| 6,263,659 B1 | 7/2001 | Dillon, IV et al. |
| 6,266,954 B1 | 7/2001 | McCallum et al. |
| 6,269,882 B1 | 8/2001 | Wellington et al. |
| 6,276,171 B1 | 8/2001 | Brugerolle |
| 6,282,901 B1 | 9/2001 | Marin et al. |
| 6,283,087 B1 | 9/2001 | Isaksen |
| 6,289,677 B1 | 9/2001 | Prociw et al. |
| 6,298,652 B1 | 10/2001 | Mittricker et al. |
| 6,298,654 B1 | 10/2001 | Vermes et al. |
| 6,298,664 B1 | 10/2001 | Åsen et al. |
| 6,301,888 B1 | 10/2001 | Gray |
| 6,301,889 B1 | 10/2001 | Gladden et al. |
| 6,305,929 B1 | 10/2001 | Chung et al. |
| 6,314,721 B1 | 11/2001 | Mathews et al. |
| 6,324,867 B1 | 12/2001 | Fanning et al. |
| 6,332,313 B1 | 12/2001 | Willis et al. |
| 6,345,493 B1 | 2/2002 | Smith et al. |
| 6,360,528 B1 | 3/2002 | Brausch et al. |
| 6,363,709 B2 | 4/2002 | Kataoka et al. |
| 6,367,258 B1 | 4/2002 | Wen et al. |
| 6,370,870 B1 | 4/2002 | Kamijo et al. |
| 6,374,591 B1 | 4/2002 | Johnson et al. |
| 6,374,594 B1 | 4/2002 | Kraft et al. |
| 6,383,461 B1 | 5/2002 | Lang |
| 6,389,814 B2 | 5/2002 | Viteri et al. |
| 6,405,536 B1 | 6/2002 | Ho et al. |
| 6,412,278 B1 | 7/2002 | Matthews |
| 6,412,302 B1 | 7/2002 | Foglietta |
| 6,412,559 B1 | 7/2002 | Gunter et al. |
| 6,418,725 B1 | 7/2002 | Maeda et al. |
| 6,429,020 B1 | 8/2002 | Thornton et al. |
| 6,430,915 B1 * | 8/2002 | Wiant et al. ............ 60/39.12 |
| 6,449,954 B2 | 9/2002 | Bachmann |
| 6,450,256 B2 | 9/2002 | Mones |
| 6,461,147 B1 | 10/2002 | Sonju et al. |
| 6,467,270 B2 | 10/2002 | Mulloy et al. |
| 6,470,682 B2 | 10/2002 | Gray |
| 6,477,859 B2 | 11/2002 | Wong et al. |
| 6,484,503 B1 | 11/2002 | Raz |
| 6,484,507 B1 | 11/2002 | Pradt |
| 6,487,863 B1 | 12/2002 | Chen et al. |
| 6,499,990 B1 | 12/2002 | Zink et al. |
| 6,502,383 B1 | 1/2003 | Janardan et al. |
| 6,505,567 B1 | 1/2003 | Anderson et al. |
| 6,505,683 B2 | 1/2003 | Minkkinen et al. |
| 6,508,209 B1 | 1/2003 | Collier |
| 6,523,349 B2 | 2/2003 | Viteri |
| 6,532,745 B1 | 3/2003 | Neary |
| 6,539,716 B2 | 4/2003 | Finger et al. |
| 6,584,775 B1 | 7/2003 | Schneider et al. |
| 6,598,398 B2 | 7/2003 | Viteri et al. |
| 6,598,399 B2 | 7/2003 | Liebig |
| 6,598,402 B2 | 7/2003 | Kataoka et al. |
| 6,606,861 B2 | 8/2003 | Snyder |
| 6,612,291 B2 | 9/2003 | Sakamoto |
| 6,615,576 B2 | 9/2003 | Sheoran et al. |
| 6,615,589 B2 | 9/2003 | Allam et al. |
| 6,622,470 B2 | 9/2003 | Viteri et al. |
| 6,622,645 B2 | 9/2003 | Havlena |
| 6,637,183 B2 | 10/2003 | Viteri et al. |
| 6,644,041 B1 | 11/2003 | Eyermann |
| 6,655,150 B1 | 12/2003 | Åsen et al. |
| 6,668,541 B2 | 12/2003 | Rice et al. |
| 6,672,863 B2 | 1/2004 | Doebbeling et al. |
| 6,675,579 B1 | 1/2004 | Yang |
| 6,684,643 B2 | 2/2004 | Frutschi |
| 6,694,735 B2 | 2/2004 | Sumser et al. |
| 6,698,412 B2 | 3/2004 | Dalla Betta |
| 6,702,570 B2 | 3/2004 | Shah et al. |
| 6,722,436 B2 | 4/2004 | Krill |
| 6,725,665 B2 | 4/2004 | Tuschy et al. |
| 6,731,501 B1 | 5/2004 | Cheng |
| 6,732,531 B2 | 5/2004 | Dickey |
| 6,742,506 B1 | 6/2004 | Grandin |
| 6,743,829 B2 | 6/2004 | Fischer-Calderon et al. |
| 6,745,573 B2 | 6/2004 | Marin et al. |
| 6,745,624 B2 | 6/2004 | Porter et al. |
| 6,748,004 B2 | 6/2004 | Jepson |
| 6,752,620 B2 | 6/2004 | Heier et al. |
| 6,767,527 B2 | 7/2004 | Åsen et al. |
| 6,772,583 B2 | 8/2004 | Bland |
| 6,790,030 B2 | 9/2004 | Fischer et al. |
| 6,805,483 B2 | 10/2004 | Tomlinson et al. |
| 6,810,673 B2 | 11/2004 | Snyder |
| 6,813,889 B2 | 11/2004 | Inoue et al. |
| 6,817,187 B2 | 11/2004 | Yu |
| 6,820,428 B2 | 11/2004 | Wylie |
| 6,821,501 B2 | 11/2004 | Matzakos et al. |
| 6,823,852 B2 | 11/2004 | Collier |
| 6,824,710 B2 | 11/2004 | Viteri et al. |
| 6,826,912 B2 | 12/2004 | Levy et al. |
| 6,826,913 B2 | 12/2004 | Wright |
| 6,838,071 B1 | 1/2005 | Olsvik et al. |
| 6,851,413 B1 | 2/2005 | Tamol |
| 6,868,677 B2 | 3/2005 | Viteri et al. |
| 6,886,334 B2 | 5/2005 | Shirakawa |
| 6,887,069 B1 | 5/2005 | Thornton et al. |
| 6,899,859 B1 | 5/2005 | Olsvik |
| 6,901,760 B2 | 6/2005 | Dittmann et al. |
| 6,904,815 B2 | 6/2005 | Widmer |
| 6,907,737 B2 | 6/2005 | Mittricker et al. |
| 6,910,335 B2 | 6/2005 | Viteri et al. |
| 6,923,915 B2 | 8/2005 | Alford et al. |
| 6,939,130 B2 | 9/2005 | Abbasi et al. |
| 6,945,029 B2 | 9/2005 | Viteri |
| 6,945,052 B2 | 9/2005 | Frutschi et al. |
| 6,945,087 B2 | 9/2005 | Porter et al. |
| 6,945,089 B2 | 9/2005 | Barie et al. |
| 6,946,419 B2 | 9/2005 | Kaefer |
| 6,969,123 B2 | 11/2005 | Vinegar et al. |
| 6,971,242 B2 | 12/2005 | Boardman |
| 6,981,358 B2 | 1/2006 | Bellucci et al. |
| 6,988,549 B1 | 1/2006 | Babcock |
| 6,993,901 B2 | 2/2006 | Shirakawa |
| 6,993,916 B2 | 2/2006 | Johnson et al. |
| 6,994,491 B2 | 2/2006 | Kittle |
| 7,007,487 B2 | 3/2006 | Belokon et al. |
| 7,010,921 B2 | 3/2006 | Intile et al. |
| 7,011,154 B2 | 3/2006 | Maher et al. |
| 7,015,271 B2 | 3/2006 | Bice et al. |
| 7,032,388 B2 | 4/2006 | Healy |
| 7,040,400 B2 | 5/2006 | de Rouffignac et al. |
| 7,043,898 B2 | 5/2006 | Rago |
| 7,043,920 B2 | 5/2006 | Viteri et al. |
| 7,045,553 B2 | 5/2006 | Hershkowitz |
| 7,053,128 B2 | 5/2006 | Hershkowitz |
| 7,056,482 B2 | 6/2006 | Hakka et al. |
| 7,059,152 B2 | 6/2006 | Oakey et al. |
| 7,065,953 B1 | 6/2006 | Kopko |
| 7,065,972 B2 | 6/2006 | Zupanc et al. |
| 7,074,033 B2 | 7/2006 | Neary |
| 7,077,199 B2 | 7/2006 | Vinegar et al. |
| 7,089,743 B2 | 8/2006 | Frutschi et al. |
| 7,096,942 B1 | 8/2006 | de Rouffignac et al. |
| 7,097,925 B2 | 8/2006 | Keefer |
| 7,104,319 B2 | 9/2006 | Vinegar et al. |
| 7,104,784 B1 | 9/2006 | Hasegawa et al. |
| 7,124,589 B2 | 10/2006 | Neary |

(56) References Cited

U.S. PATENT DOCUMENTS

| | | |
|---|---|---|
| 7,137,256 B1 | 11/2006 | Stuttaford et al. |
| 7,137,623 B2 | 11/2006 | Mockry et al. |
| 7,143,572 B2 * | 12/2006 | Ooka et al. ............... 60/39.182 |
| 7,143,606 B2 | 12/2006 | Tranier |
| 7,146,969 B2 | 12/2006 | Weirich |
| 7,147,461 B2 | 12/2006 | Neary |
| 7,148,261 B2 | 12/2006 | Hershkowitz et al. |
| 7,152,409 B2 | 12/2006 | Yee et al. |
| 7,162,875 B2 | 1/2007 | Fletcher et al. |
| 7,168,265 B2 | 1/2007 | Briscoe et al. |
| 7,168,488 B2 | 1/2007 | Olsvik et al. |
| 7,183,328 B2 | 2/2007 | Hershkowitz et al. |
| 7,185,497 B2 | 3/2007 | Dudebout et al. |
| 7,194,869 B2 | 3/2007 | McQuiggan et al. |
| 7,197,880 B2 | 4/2007 | Thornton et al. |
| 7,217,303 B2 | 5/2007 | Hershkowitz et al. |
| 7,225,623 B2 | 6/2007 | Koshoffer |
| 7,237,385 B2 | 7/2007 | Carrea |
| 7,284,362 B2 | 10/2007 | Marin et al. |
| 7,299,619 B2 | 11/2007 | Briesch et al. |
| 7,299,868 B2 | 11/2007 | Zapadinski |
| 7,302,801 B2 | 12/2007 | Chen |
| 7,305,817 B2 | 12/2007 | Blodgett et al. |
| 7,305,831 B2 | 12/2007 | Carrea et al. |
| 7,313,916 B2 | 1/2008 | Pellizzari |
| 7,318,317 B2 | 1/2008 | Carrea |
| 7,343,742 B2 | 3/2008 | Wimmer et al. |
| 7,353,655 B2 | 4/2008 | Bolis et al. |
| 7,357,857 B2 | 4/2008 | Hart et al. |
| 7,363,756 B2 | 4/2008 | Carrea et al. |
| 7,363,764 B2 | 4/2008 | Griffin et al. |
| 7,381,393 B2 | 6/2008 | Lynn |
| 7,401,577 B2 | 7/2008 | Saucedo et al. |
| 7,410,525 B1 | 8/2008 | Liu et al. |
| 7,416,137 B2 | 8/2008 | Hagen et al. |
| 7,434,384 B2 | 10/2008 | Lord et al. |
| 7,438,744 B2 | 10/2008 | Beaumont |
| 7,467,942 B2 | 12/2008 | Carroni et al. |
| 7,468,173 B2 | 12/2008 | Hughes et al. |
| 7,472,550 B2 | 1/2009 | Lear et al. |
| 7,481,048 B2 | 1/2009 | Harmon et al. |
| 7,481,275 B2 | 1/2009 | Olsvik et al. |
| 7,482,500 B2 | 1/2009 | Johann et al. |
| 7,485,761 B2 | 2/2009 | Schindler et al. |
| 7,488,857 B2 | 2/2009 | Johann et al. |
| 7,490,472 B2 | 2/2009 | Lynghjem et al. |
| 7,491,250 B2 | 2/2009 | Hershkowitz et al. |
| 7,492,054 B2 | 2/2009 | Catlin |
| 7,493,769 B2 | 2/2009 | Jangili |
| 7,498,009 B2 | 3/2009 | Leach et al. |
| 7,503,178 B2 | 3/2009 | Bucker et al. |
| 7,503,948 B2 | 3/2009 | Hershkowitz et al. |
| 7,506,501 B2 | 3/2009 | Anderson et al. |
| 7,513,099 B2 | 4/2009 | Nuding et al. |
| 7,513,100 B2 | 4/2009 | Motter et al. |
| 7,516,626 B2 | 4/2009 | Brox et al. |
| 7,520,134 B2 | 4/2009 | Durbin et al. |
| 7,523,603 B2 | 4/2009 | Hagen et al. |
| 7,536,252 B1 | 5/2009 | Hibshman et al. |
| 7,536,873 B2 | 5/2009 | Nohlen |
| 7,540,150 B2 | 6/2009 | Schmid et al. |
| 7,559,977 B2 | 7/2009 | Fleischer et al. |
| 7,562,519 B1 | 7/2009 | Harris et al. |
| 7,562,529 B2 | 7/2009 | Kuspert et al. |
| 7,566,394 B2 | 7/2009 | Koseoglu |
| 7,574,856 B2 | 8/2009 | Mak |
| 7,591,866 B2 | 9/2009 | Bose |
| 7,594,386 B2 | 9/2009 | Narayanan et al. |
| 7,610,752 B2 | 11/2009 | Dalla Betta et al. |
| 7,610,759 B2 | 11/2009 | Yoshida et al. |
| 7,611,681 B2 | 11/2009 | Kaefer |
| 7,614,352 B2 | 11/2009 | Anthony et al. |
| 7,618,606 B2 | 11/2009 | Fan et al. |
| 7,631,493 B2 | 12/2009 | Shirakawa et al. |
| 7,634,915 B2 | 12/2009 | Hoffmann et al. |
| 7,635,408 B2 | 12/2009 | Mak et al. |
| 7,637,093 B2 | 12/2009 | Rao |
| 7,644,573 B2 | 1/2010 | Smith et al. |
| 7,650,744 B2 | 1/2010 | Varatharajan et al. |
| 7,654,320 B2 | 2/2010 | Payton |
| 7,654,330 B2 | 2/2010 | Zubrin et al. |
| 7,655,071 B2 | 2/2010 | De Vreede |
| 7,670,135 B1 | 3/2010 | Zink et al. |
| 7,673,454 B2 | 3/2010 | Saito et al. |
| 7,673,685 B2 | 3/2010 | Huntley Shaw et al. |
| 7,674,443 B1 | 3/2010 | Davis |
| 7,677,309 B2 | 3/2010 | Shaw et al. |
| 7,681,394 B2 | 3/2010 | Haugen |
| 7,682,597 B2 | 3/2010 | Blumenfeld et al. |
| 7,690,204 B2 | 4/2010 | Drnevich et al. |
| 7,691,788 B2 | 4/2010 | Tan et al. |
| 7,695,703 B2 | 4/2010 | Sobolevskiy et al. |
| 7,717,173 B2 | 5/2010 | Grott |
| 7,721,543 B2 | 5/2010 | Massey et al. |
| 7,726,114 B2 | 6/2010 | Evulet |
| 7,734,408 B2 | 6/2010 | Shiraki |
| 7,739,864 B2 | 6/2010 | Finkenrath et al. |
| 7,749,311 B2 | 7/2010 | Saito et al. |
| 7,752,848 B2 | 7/2010 | Balan et al. |
| 7,752,850 B2 | 7/2010 | Laster et al. |
| 7,753,039 B2 | 7/2010 | Harima et al. |
| 7,753,972 B2 | 7/2010 | Zubrin et al. |
| 7,762,084 B2 | 7/2010 | Martis et al. |
| 7,763,163 B2 | 7/2010 | Koseoglu |
| 7,763,227 B2 | 7/2010 | Wang |
| 7,765,810 B2 | 8/2010 | Pfefferle |
| 7,788,897 B2 | 9/2010 | Campbell et al. |
| 7,789,159 B1 | 9/2010 | Bader |
| 7,789,658 B2 | 9/2010 | Towler et al. |
| 7,789,944 B2 | 9/2010 | Saito et al. |
| 7,793,494 B2 | 9/2010 | Wirth et al. |
| 7,802,434 B2 | 9/2010 | Varatharajan et al. |
| 7,815,873 B2 | 10/2010 | Sankaranarayanan et al. |
| 7,815,892 B2 | 10/2010 | Hershkowitz et al. |
| 7,819,951 B2 | 10/2010 | White et al. |
| 7,824,179 B2 | 11/2010 | Hasegawa et al. |
| 7,827,778 B2 | 11/2010 | Finkenrath et al. |
| 7,827,794 B1 | 11/2010 | Pronske et al. |
| 7,841,186 B2 | 11/2010 | So et al. |
| 7,845,406 B2 | 12/2010 | Nitschke |
| 7,846,401 B2 | 12/2010 | Hershkowitz et al. |
| 7,861,511 B2 | 1/2011 | Chillar et al. |
| 7,874,140 B2 | 1/2011 | Fan et al. |
| 7,874,350 B2 | 1/2011 | Pfefferle |
| 7,875,402 B2 | 1/2011 | Hershkowitz et al. |
| 7,882,692 B2 | 2/2011 | Pronske et al. |
| 7,886,522 B2 | 2/2011 | Kammel |
| 7,895,822 B2 | 3/2011 | Hoffmann et al. |
| 7,896,105 B2 | 3/2011 | Dupriest |
| 7,906,304 B2 | 3/2011 | Kohr |
| 7,909,898 B2 | 3/2011 | White et al. |
| 7,914,749 B2 | 3/2011 | Carstens et al. |
| 7,914,764 B2 | 3/2011 | Hershkowitz et al. |
| 7,918,906 B2 | 4/2011 | Zubrin et al. |
| 7,921,633 B2 | 4/2011 | Rising |
| 7,922,871 B2 | 4/2011 | Price et al. |
| 7,926,292 B2 | 4/2011 | Rabovitser et al. |
| 7,931,712 B2 | 4/2011 | Zubrin et al. |
| 7,931,731 B2 | 4/2011 | Van Heeringen et al. |
| 7,931,888 B2 | 4/2011 | Drnevich et al. |
| 7,934,926 B2 | 5/2011 | Kornbluth et al. |
| 7,942,003 B2 | 5/2011 | Baudoin et al. |
| 7,942,008 B2 | 5/2011 | Joshi et al. |
| 7,943,097 B2 | 5/2011 | Golden et al. |
| 7,955,403 B2 | 6/2011 | Ariyapadi et al. |
| 7,966,822 B2 | 6/2011 | Myers et al. |
| 7,976,803 B2 | 7/2011 | Hooper et al. |
| 7,980,312 B1 | 7/2011 | Hill et al. |
| 7,985,399 B2 | 7/2011 | Drnevich et al. |
| 7,988,750 B2 | 8/2011 | Lee et al. |
| 8,001,789 B2 | 8/2011 | Vega et al. |
| 8,029,273 B2 | 10/2011 | Paschereit et al. |
| 8,036,813 B2 | 10/2011 | Tonetti et al. |
| 8,038,416 B2 | 10/2011 | Ono et al. |

(56) References Cited

U.S. PATENT DOCUMENTS

| | | |
|---|---|---|
| 8,038,746 B2 | 10/2011 | Clark |
| 8,038,773 B2 | 10/2011 | Ochs et al. |
| 8,046,986 B2 | 11/2011 | Chillar et al. |
| 8,047,007 B2 | 11/2011 | Zubrin et al. |
| 8,051,638 B2 | 11/2011 | Aljabari et al. |
| 8,061,120 B2 | 11/2011 | Hwang |
| 8,062,617 B2 | 11/2011 | Stakhev et al. |
| 8,065,870 B2 | 11/2011 | Jobson et al. |
| 8,065,874 B2 | 11/2011 | Fong et al. |
| 8,074,439 B2 | 12/2011 | Foret |
| 8,080,225 B2 | 12/2011 | Dickinson et al. |
| 8,083,474 B2 | 12/2011 | Hashimoto et al. |
| 8,097,230 B2 | 1/2012 | Mesters et al. |
| 8,101,146 B2 | 1/2012 | Fedeyko et al. |
| 8,105,559 B2 | 1/2012 | Melville et al. |
| 8,110,012 B2 | 2/2012 | Chiu et al. |
| 8,117,825 B2 | 2/2012 | Griffin et al. |
| 8,117,846 B2 | 2/2012 | Wilbraham |
| 8,127,558 B2 | 3/2012 | Bland et al. |
| 8,127,936 B2 | 3/2012 | Liu et al. |
| 8,127,937 B2 | 3/2012 | Liu et al. |
| 8,133,298 B2 | 3/2012 | Lanyi et al. |
| 8,166,766 B2 | 5/2012 | Draper |
| 8,167,960 B2 | 5/2012 | Gil |
| 8,176,982 B2 | 5/2012 | Gil et al. |
| 8,191,360 B2 | 6/2012 | Fong et al. |
| 8,191,361 B2 | 6/2012 | Fong et al. |
| 8,196,387 B2 | 6/2012 | Shah et al. |
| 8,196,413 B2 | 6/2012 | Mak |
| 8,201,402 B2 | 6/2012 | Fong et al. |
| 8,205,455 B2 | 6/2012 | Popovic |
| 8,206,669 B2 | 6/2012 | Schaffer et al. |
| 8,209,192 B2 | 6/2012 | Gil et al. |
| 8,215,105 B2 | 7/2012 | Fong et al. |
| 8,220,247 B2 | 7/2012 | Wijmans et al. |
| 8,220,248 B2 | 7/2012 | Wijmans et al. |
| 8,220,268 B2 | 7/2012 | Callas |
| 8,225,600 B2 | 7/2012 | Theis |
| 8,226,912 B2 | 7/2012 | Kloosterman et al. |
| 8,240,142 B2 | 8/2012 | Fong et al. |
| 8,240,153 B2 | 8/2012 | Childers et al. |
| 8,245,492 B2 | 8/2012 | Draper |
| 8,245,493 B2 | 8/2012 | Minto |
| 8,247,462 B2 | 8/2012 | Boshoff et al. |
| 8,257,476 B2 | 9/2012 | White et al. |
| 8,261,823 B1 | 9/2012 | Hill et al. |
| 8,262,343 B2 | 9/2012 | Hagen |
| 8,266,883 B2 | 9/2012 | Dion Ouellet et al. |
| 8,266,913 B2 | 9/2012 | Snook et al. |
| 8,268,044 B2 | 9/2012 | Wright et al. |
| 8,281,596 B1 | 10/2012 | Rohrssen et al. |
| 8,316,665 B2 | 11/2012 | Mak |
| 8,316,784 B2 | 11/2012 | D'Agostini |
| 8,337,613 B2 | 12/2012 | Zauderer |
| 8,347,600 B2 | 1/2013 | Wichmann et al. |
| 8,348,551 B2 | 1/2013 | Baker et al. |
| 8,371,100 B2 | 2/2013 | Draper |
| 8,372,251 B2 | 2/2013 | Goller et al. |
| 8,377,184 B2 | 2/2013 | Fujikawa et al. |
| 8,377,401 B2 | 2/2013 | Darde et al. |
| 8,388,919 B2 | 3/2013 | Hooper et al. |
| 8,397,482 B2 | 3/2013 | Kraemer et al. |
| 8,398,757 B2 | 3/2013 | Iijima et al. |
| 8,409,307 B2 | 4/2013 | Drnevich et al. |
| 8,414,694 B2 | 4/2013 | Iijima et al. |
| 8,424,282 B2 | 4/2013 | Vollmer et al. |
| 8,424,601 B2 | 4/2013 | Betzer-Zilevitch |
| 8,436,489 B2 | 5/2013 | Stahlkopf et al. |
| 8,453,461 B2 | 6/2013 | Draper |
| 8,453,462 B2 | 6/2013 | Wichmann et al. |
| 8,453,583 B2 | 6/2013 | Malavasi et al. |
| 8,454,350 B2 | 6/2013 | Berry et al. |
| 8,475,160 B2 | 7/2013 | Campbell et al. |
| 8,539,749 B1 | 9/2013 | Wichmann et al. |
| 8,567,200 B2 | 10/2013 | Brook et al. |
| 8,616,294 B2 | 12/2013 | Zubrin et al. |
| 8,627,643 B2 | 1/2014 | Chillar et al. |
| 2001/0000049 A1 | 3/2001 | Kataoka et al. |
| 2001/0029732 A1 | 10/2001 | Bachmann |
| 2001/0045090 A1 | 11/2001 | Gray |
| 2002/0043063 A1 | 4/2002 | Kataoka et al. |
| 2002/0053207 A1 | 5/2002 | Finger et al. |
| 2002/0069648 A1 | 6/2002 | Levy et al. |
| 2002/0187449 A1 | 12/2002 | Doebbeling et al. |
| 2003/0005698 A1 | 1/2003 | Keller |
| 2003/0131582 A1 | 7/2003 | Anderson et al. |
| 2003/0134241 A1 | 7/2003 | Marin et al. |
| 2003/0221409 A1 | 12/2003 | McGowan |
| 2004/0006994 A1 | 1/2004 | Walsh et al. |
| 2004/0068981 A1 | 4/2004 | Siefker et al. |
| 2004/0166034 A1 | 8/2004 | Kaefer |
| 2004/0170559 A1 | 9/2004 | Hershkowitz et al. |
| 2004/0223408 A1 | 11/2004 | Mathys et al. |
| 2004/0238654 A1 | 12/2004 | Hagen et al. |
| 2005/0028529 A1 | 2/2005 | Bartlett et al. |
| 2005/0144961 A1 | 7/2005 | Colibaba-Evulet et al. |
| 2005/0197267 A1 | 9/2005 | Zaki et al. |
| 2005/0229585 A1 | 10/2005 | Webster |
| 2005/0236602 A1 | 10/2005 | Viteri et al. |
| 2006/0112675 A1 | 6/2006 | Anderson et al. |
| 2006/0158961 A1 | 7/2006 | Ruscheweyh et al. |
| 2006/0183009 A1 | 8/2006 | Berlowitz et al. |
| 2006/0196812 A1 | 9/2006 | Beetge et al. |
| 2006/0248888 A1 | 11/2006 | Geskes |
| 2007/0000242 A1 | 1/2007 | Harmon et al. |
| 2007/0044475 A1 | 3/2007 | Leser et al. |
| 2007/0044479 A1 | 3/2007 | Brandt et al. |
| 2007/0082306 A1* | 4/2007 | Drnevich et al. ............... 431/12 |
| 2007/0089425 A1 | 4/2007 | Motter et al. |
| 2007/0107430 A1 | 5/2007 | Schmid et al. |
| 2007/0144747 A1 | 6/2007 | Steinberg |
| 2007/0231233 A1 | 10/2007 | Bose |
| 2007/0234702 A1 | 10/2007 | Hagen et al. |
| 2007/0245736 A1 | 10/2007 | Barnicki |
| 2007/0249738 A1 | 10/2007 | Haynes et al. |
| 2007/0272201 A1 | 11/2007 | Amano et al. |
| 2008/0000229 A1 | 1/2008 | Kuspert et al. |
| 2008/0006561 A1 | 1/2008 | Moran et al. |
| 2008/0010967 A1 | 1/2008 | Griffin et al. |
| 2008/0034727 A1 | 2/2008 | Sutikno |
| 2008/0038598 A1 | 2/2008 | Berlowitz et al. |
| 2008/0047280 A1 | 2/2008 | Dubar |
| 2008/0066443 A1 | 3/2008 | Frutschi et al. |
| 2008/0115478 A1 | 5/2008 | Sullivan |
| 2008/0118310 A1 | 5/2008 | Graham |
| 2008/0127632 A1 | 6/2008 | Finkenrath et al. |
| 2008/0155984 A1 | 7/2008 | Liu et al. |
| 2008/0178611 A1 | 7/2008 | Ding |
| 2008/0202123 A1 | 8/2008 | Sullivan et al. |
| 2008/0223038 A1 | 9/2008 | Lutz et al. |
| 2008/0250795 A1 | 10/2008 | Katdare et al. |
| 2008/0251234 A1 | 10/2008 | Wilson et al. |
| 2008/0290719 A1 | 11/2008 | Kaminsky et al. |
| 2008/0309087 A1 | 12/2008 | Evulet et al. |
| 2009/0000762 A1 | 1/2009 | Wilson et al. |
| 2009/0025390 A1 | 1/2009 | Christensen et al. |
| 2009/0038247 A1 | 2/2009 | Taylor et al. |
| 2009/0056342 A1 | 3/2009 | Kirzhner |
| 2009/0064653 A1 | 3/2009 | Hagen et al. |
| 2009/0071166 A1 | 3/2009 | Hagen et al. |
| 2009/0107141 A1 | 4/2009 | Chillar et al. |
| 2009/0117024 A1 | 5/2009 | Weedon et al. |
| 2009/0120087 A1 | 5/2009 | Sumser et al. |
| 2009/0157230 A1 | 6/2009 | Hibshman et al. |
| 2009/0193809 A1 | 8/2009 | Schroder et al. |
| 2009/0205334 A1 | 8/2009 | Aljabari et al. |
| 2009/0218821 A1 | 9/2009 | ElKady et al. |
| 2009/0223227 A1 | 9/2009 | Lipinski et al. |
| 2009/0229263 A1 | 9/2009 | Ouellet et al. |
| 2009/0235637 A1 | 9/2009 | Foret |
| 2009/0241506 A1 | 10/2009 | Nilsson |
| 2009/0255242 A1 | 10/2009 | Paterson et al. |
| 2009/0262599 A1 | 10/2009 | Kohrs et al. |
| 2009/0266540 A1* | 10/2009 | De Francesco ............... 166/261 |

(56) References Cited

U.S. PATENT DOCUMENTS

| | | |
|---|---|---|
| 2009/0284013 A1 | 11/2009 | Anand et al. |
| 2009/0301054 A1 | 12/2009 | Simpson et al. |
| 2009/0301099 A1 | 12/2009 | Nigro |
| 2010/0003123 A1 | 1/2010 | Smith |
| 2010/0018218 A1 | 1/2010 | Riley et al. |
| 2010/0058732 A1 | 3/2010 | Kaufmann et al. |
| 2010/0115960 A1 | 5/2010 | Brautsch et al. |
| 2010/0126176 A1 | 5/2010 | Kim |
| 2010/0126906 A1 | 5/2010 | Sury |
| 2010/0162703 A1 | 7/2010 | Li et al. |
| 2010/0170253 A1 | 7/2010 | Berry et al. |
| 2010/0180565 A1 | 7/2010 | Draper |
| 2010/0193742 A1 | 8/2010 | Oettinger ............... 252/373 |
| 2010/0300102 A1 | 12/2010 | Bathina et al. |
| 2010/0310439 A1 | 12/2010 | Brok et al. |
| 2010/0322759 A1 | 12/2010 | Tanioka |
| 2010/0326084 A1 | 12/2010 | Anderson et al. |
| 2011/0000221 A1 | 1/2011 | Minta et al. |
| 2011/0000671 A1 | 1/2011 | Hershkowitz et al. |
| 2011/0036082 A1 | 2/2011 | Collinot |
| 2011/0048002 A1 | 3/2011 | Taylor et al. |
| 2011/0048010 A1 | 3/2011 | Balcezak et al. |
| 2011/0072779 A1 | 3/2011 | ELKady et al. |
| 2011/0088379 A1 | 4/2011 | Nanda |
| 2011/0110759 A1 | 5/2011 | Sanchez et al. |
| 2011/0126512 A1 | 6/2011 | Anderson |
| 2011/0138766 A1 | 6/2011 | ELKady et al. |
| 2011/0162353 A1 | 7/2011 | Vanvolsem et al. |
| 2011/0185701 A1 | 8/2011 | Koda et al. ............. 60/39.182 |
| 2011/0205837 A1 | 8/2011 | Gentgen |
| 2011/0226010 A1 | 9/2011 | Baxter |
| 2011/0227346 A1 | 9/2011 | Klenven |
| 2011/0232545 A1 | 9/2011 | Clements |
| 2011/0239653 A1 | 10/2011 | Valeev et al. |
| 2011/0265447 A1 | 11/2011 | Cunningham |
| 2011/0300493 A1 | 12/2011 | Mittricker et al. |
| 2012/0023954 A1 | 2/2012 | Wichmann |
| 2012/0023955 A1 | 2/2012 | Draper |
| 2012/0023956 A1 | 2/2012 | Popovic |
| 2012/0023957 A1 | 2/2012 | Draper et al. |
| 2012/0023958 A1 | 2/2012 | Snook et al. |
| 2012/0023960 A1 | 2/2012 | Minto |
| 2012/0023962 A1 | 2/2012 | Wichmann et al. |
| 2012/0023963 A1 | 2/2012 | Wichmann et al. |
| 2012/0023966 A1 | 2/2012 | Ouellet et al. |
| 2012/0031581 A1 | 2/2012 | Chillar et al. |
| 2012/0032810 A1 | 2/2012 | Chillar et al. |
| 2012/0085100 A1 | 4/2012 | Hughes et al. |
| 2012/0096870 A1 | 4/2012 | Wichmann et al. |
| 2012/0119512 A1 | 5/2012 | Draper |
| 2012/0131925 A1 | 5/2012 | Mittricker et al. |
| 2012/0144837 A1 | 6/2012 | Rasmussen et al. |
| 2012/0185144 A1 | 7/2012 | Draper |
| 2012/0192565 A1 | 8/2012 | Tretyakov et al. |
| 2012/0247105 A1 | 10/2012 | Nelson et al. |
| 2012/0260660 A1 | 10/2012 | Kraemer et al. |
| 2013/0086916 A1 | 4/2013 | Oelfke et al. |
| 2013/0086917 A1 | 4/2013 | Slobodyanskiy et al. |
| 2013/0091853 A1 | 4/2013 | Denton et al. |
| 2013/0091854 A1 | 4/2013 | Gupta et al. |
| 2013/0104562 A1 | 5/2013 | Oelfke et al. |
| 2013/0104563 A1 | 5/2013 | Oelfke et al. |
| 2013/0125554 A1 | 5/2013 | Mittricker et al. |
| 2013/0125555 A1 | 5/2013 | Mittricker et al. |
| 2013/0232980 A1 | 9/2013 | Chen et al. |
| 2013/0269310 A1 | 10/2013 | Wichmann et al. |
| 2013/0269311 A1 | 10/2013 | Wichmann et al. |
| 2013/0269355 A1 | 10/2013 | Wichmann et al. |
| 2013/0269356 A1 | 10/2013 | Butkiewicz et al. |
| 2013/0269357 A1 | 10/2013 | Wichmann et al. |
| 2013/0269358 A1 | 10/2013 | Wichmann et al. |
| 2013/0269360 A1 | 10/2013 | Wichmann et al. |
| 2013/0269361 A1 | 10/2013 | Wichmann et al. |
| 2013/0269362 A1 | 10/2013 | Wichmann et al. |
| 2013/0283808 A1 | 10/2013 | Kolvick |
| 2014/0000271 A1 | 1/2014 | Mittricker et al. |
| 2014/0000273 A1 | 1/2014 | Mittricker et al. |
| 2014/0007590 A1 | 1/2014 | Huntington et al. |
| 2014/0013766 A1 | 1/2014 | Mittricker et al. |
| 2014/0020398 A1 | 1/2014 | Mittricker et al. |
| 2014/0060073 A1 | 3/2014 | Slobodyanskiy et al. |
| 2014/0123620 A1 | 5/2014 | Huntington et al. |
| 2014/0123624 A1 | 5/2014 | Minto |
| 2014/0123659 A1 | 5/2014 | Biyani et al. |
| 2014/0123660 A1 | 5/2014 | Stoia et al. |
| 2014/0123668 A1 | 5/2014 | Huntington et al. |
| 2014/0123669 A1 | 5/2014 | Huntington et al. |
| 2014/0123672 A1 | 5/2014 | Huntington et al. |

FOREIGN PATENT DOCUMENTS

| | | | |
|---|---|---|---|
| EP | 0770771 | 5/1997 | |
| GB | 0776269 | 6/1957 | |
| GB | 2117053 | 10/1983 | |
| JP | 11-264325 | 9/1999 | ............... F02C 6/18 |
| WO | WO9906674 | 2/1999 | |
| WO | WO9963210 | 12/1999 | |
| WO | WO2007068682 | 6/2007 | |
| WO | WO2008142009 | 11/2008 | |
| WO | WO 2009120779 A2 * | 10/2009 | |
| WO | WO 2009121008 A2 * | 10/2009 | |
| WO | WO2011003606 | 1/2011 | |
| WO | WO2012003489 | 1/2012 | |
| WO | WO2012128928 | 9/2012 | |
| WO | WO2012128929 | 9/2012 | |
| WO | WO2012170114 | 12/2012 | |
| WO | WO2013147632 | 10/2013 | |
| WO | WO2013147633 | 10/2013 | |
| WO | WO2013155214 | 10/2013 | |
| WO | WO2013163045 | 10/2013 | |
| WO | WO2014071118 | 5/2014 | |
| WO | WO2014071215 | 5/2014 | |

OTHER PUBLICATIONS

George P. Stoeppelwerth, Exhaust Gas Provides Alternative Gas Source for Cyclic EOR, Apr. 26, 1993, Located at: http://www.ogj.com/articles/print/volume-91/issue-17/in-this-issue/drilling/exhaust-gas-provides-alternative-gas-source-for-cyclic-eor.html.*

Ahmed, S. et al. (1998) "Catalytic Partial Oxidation Reforming of Hydrocarbon Fuels," 1998 Fuel Cell Seminar, 7 pgs.

Air Products and Chemicals, Inc. (2008) "Air Separation Technology—Ion Transport Membrane (ITM)," www.airproducts.com/ASUsales, 3 pgs.

Air Products and Chemicals, Inc. (2011) "Air Separation Technology Ion Transport Membrane (ITM)," www.airproducts.com/gasification, 4 pgs.

Anderson, R. E. (2006) "Durability and Reliability Demonstration of a Near-Zero-Emission Gas-Fired Power Plant," California Energy Comm., CEC 500-2006-074, 80 pgs.

Baxter, E. et al. (2003) "Fabricate and Test an Advanced Non-Polluting Turbine Drive Gas Generator," U. S. Dept. of Energy, Nat'l Energy Tech. Lab., DE-FC26-00NT 40804, 51 pgs.

Bolland, O. et al. (1998) "Removal of CO2 From Gas Turbine Power Plants Evaluation of Pre- and Postcombustion Methods," SINTEF Group, www.energy.sintef.no/publ/xergi/98/3/art-8engelsk.htm, 11 pgs.

BP Press Release (2006) "BP and Edison Mission Group Plan Major Hydrogen Power Project for California," www.bp.com/hydrogenpower, 2 pgs.

Bryngelsson, M. et al. (2005) "Feasibility Study of $CO_2$ Removal From Pressurized Flue Gas in a Fully Fired Combined Cycle—The Sargas Project," KTH—Royal Institute of Technology, Dept. of Chemical Engineering and Technology, 9 pgs.

Clark, Hal (2002) "Development of a Unique Gas Generator for a Non-Polluting Power Plant," California Energy Commission Feasibility Analysis, P500-02-011F, 42 pgs.

Foy, Kirsten et al. (2005) "Comparison of Ion Transport Membranes," Fourth Annual Conference on Carbon Capture and Sequestration, DOE/NETL; 11 pgs.

(56) References Cited

OTHER PUBLICATIONS

Cho, J. H. et al. (2005) "Marrying LNG and Power Generation," Energy Markets; 10, 8; ABI/INFORM Trade & Industry, 8 pgs.

Ciulia, Vincent. (2001-2003) "Auto Repair. How the Engine Works," http://autorepair.about.com/cs/generalinfo/a/aa060500a.htm, 1 page.

Corti, A. et al. (1988) "Athabasca Mineable Oil Sands: The RTR/Gulf Extraction Process Theoretical Model of Bitumen Detachment," $4^{th}$ UNITAR/UNDP Int'l Conf. on Heavy Crude and Tar Sands Proceedings, v.5, paper No. 81, Edmonton, AB, Canada, 4 pgs.

Science Clarified (2012) "Cryogenics," http://www.scienceclarified.com/Co-Di/Cryogenics.html; 6 pgs.

Defrate, L. A. et al. (1959) "Optimum Design of Ejector Using Digital Computers," Chem. Eng. Prog. Symp. Ser., 55 ( 21), 12 pgs.

Ditaranto, M. et al. (2006) "Combustion Instabilities in Sudden Expansion Oxy-Fuel Flames," ScienceDirect, Combustion and Flame, v.146, 19 pgs.

Elwell, L. C. et al. (2005) "Technical Overview of Carbon Dioxide Capture Technologies for Coal-Fired Power Plants," MPR Associates, Inc., www.mpr.com/uploads/news/co2-capture-coal-fired.pdf, 15 pgs.

Eriksson, Sara. (2005) "Development of Methane Oxidation Catalysts for Different Gas Turbine Combustor Concepts," KTH—The Royal Institute of Technology, Department of Chemical Engineering and Technology, Chemical Technology, Licentiate Thesis, Stockholm Sweden; 45 pgs.

Ertesvag, I. S. et al. (2005) "Exergy Analysis of a Gas-Turbine Combined-Cycle Power Plant With Precombustion $CO_2$ Capture," Elsevier, 34 pgs.

ElKady, Ahmed M. et al. (2009) "Application of Exhaust Gas Recirculation in a DLN F-Class Combustion System for Postcombustion Carbon Capture," ASME J. Engineering for Gas Turbines and Power, vol. 131, 6 pgs.

Evulet, Andrei T. et al. (2009) "On the Performance and Operability of GE's Dry Low $NO_x$ Combustors utilizing Exhaust Gas Recirculation for Post-Combustion Carbon Capture," Energy Procedia I, 7 pgs.

Caldwell Energy Company (2011) "Wet Compression"; IGTI 2011—CTIC Wet Compression, http://www.turbineinletcooling.org/resources/papers/CTIC_WetCompression_Shepherd_ASMETurboExpo2011.pdf, 22 pgs.

Luby, P. et al. (2003) "Zero Carbon Power Generation: IGCC as the Premium Option," Powergen International, 19 pgs.

MacAdam, S. et al. (2007) "Coal-Based Oxy-Fuel System Evaluation and Combustor Development," Clean Energy Systems, Inc.; presented at the $2^{nd}$ International Freiberg Conference on IGCC & XtL Technologies, 6 pgs.

Morehead, H. (2007) "Siemens Global Gasification and IGCC Update," Siemens, Coal-Gen, 17 pgs.

Nanda, R. et al. (2007) "Utilizing Air Based Technologies as Heat Source for LNG Vaporization," presented at the $86^{th}$ Annual convention of the Gas Processors of America (GPA 2007), San Antonio, TX; 13 pgs.

Reeves, S. R. (2001) "Geological Sequestration of $CO_2$ in Deep, Unmineable Coalbeds: An Integrated Research and Commercial-Scale Field Demonstration Project," SPE 71749; presented at the 2001 SPE Annual Technical Conference and Exhibition, New Orleans, Louisiana, 10 pgs.

Reeves, S. R. (2003) "Enhanced Coalbed Methane Recovery," Society of Petroleum Engineers 101466-DL; SPE Distinguished Lecture Series, 8 pgs.

Richards, Geo A., et al. (2001) "Advanced Steam Generators," National Energy Technology Lab., Pittsburgh, PA, and Morgantown, WV; NASA Glenn Research Center (US).

Rosetta, M. J. et al. (2006) "Integrating Ambient Air Vaporization Technology with Waste Heat Recovery—A Fresh Approach to LNG Vaporization," presented at the $85^{th}$ annual convention of the Gas Processors of America (GPA 2006), Grapevine, Texas, 22 pgs.

Snarheim, D. et al. (2006) "Control Design for a Gas Turbine Cycle With $CO_2$ Capture Capabilities," Modeling, Identification and Control, vol. 00; presented at the $16^{th}$ IFAC World Congress, Prague, Czech Republic, 10 pgs.

Ulfsnes, R. E. et al. (2003) "Investigation of Physical Properties for $CO_2/H_2O$ Mixtures for use in Semi-Closed $O_2/CO_2$ Gas Turbine Cycle With $CO_2$-Capture," Department of Energy and Process Eng., Norwegian Univ. of Science and Technology, 9 pgs.

van Hemert, P. et al. (2006) "Adsorption of Carbon Dioxide and a Hydrogen—Carbon Dioxide Mixture," Int'l Coalbed Methane Symposium (Tuscaloosa, AL) Paper 0615, 9 pgs.

Zhu, J. et al. (2002) "Recovery of Coalbed Methane by Gas Injection," Society of Petroleum Engineers 75255; presented at the 2002 SPE Annual Technical Conference and Exhibition, Tulsa, Oklahoma, 15 pgs.

U.S. Appl. No. 14/144,511, filed Dec. 30, 2013, Thatcher et al.
PCT/RU2013/000162, filed Feb. 28, 2013, General Electric Company.
U.S. Appl. No. 14/067,679, filed Oct. 30, 2013, Fadde et al.
U.S. Appl. No. 14/067,714, filed Oct. 30, 2013, Antoniono et al.
U.S. Appl. No. 14/067,726, filed Oct. 30, 2013, Antoniono et al.
U.S. Appl. No. 14/067,731, filed Oct. 30, 2013, Antoniono et al.
U.S. Appl. No. 14/067,739, filed Oct. 30, 2013, Antoniono et al.
U.S. Appl. No. 14/067,797, filed Oct. 31, 2013, Krull et al.
U.S. Appl. No. 14/135,055, filed Dec. 19, 2013, Biyani et al.

* cited by examiner

LOW EMISSION POWER GENERATION AND HYDROCARBON RECOVERY SYSTEMS AND METHODS

CROSS-REFERENCE TO RELATED APPLICATIONS

This application is the National Stage entry under 35 U.S.C. 371 of PCT/US2010/049279, filed on Sep. 17, 2010, entitled LOW EMISSION POWER GENERATION AND HYDROCARBON RECOVERY SYSTEMS AND METHODS which claims the benefit under 35 U.S.C. §119(e) of pending U.S. Provisional Application Ser. No. 61/260,636, filed on 12 Nov. 2009, the entirety of which is incorporated herein by reference for all purposes.

Additionally, it is noted that this application relates to International Patent Application No. PCT/US2009/038247 filed 25 Mar. 2009, which, in turn, claims the benefit of U.S. Provisional Application No. 61/072,292, filed 28 Mar. 2008 and U.S. Provisional Application No. 61/153,508, filed 18 Feb. 2009.

FIELD

Embodiments of the invention relate to low emission power generation in a hydrocarbon recovery processes. More particularly, embodiments of the invention relate to methods and systems for utilizing nitrogen, oxygen, carbon dioxide, and/or hydrocarbon fuel to generate power in a very low emission hydrocarbon recovery process.

TECHNOLOGY BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

Many enhanced hydrocarbon recovery operations can be classified as one of the following types: pressure maintenance and miscible flooding. In a pressure maintenance operation, inert gasses such as nitrogen are injected into a primarily gaseous reservoir to maintain at least a minimal pressure in the reservoir to prevent retrograde condensation and improve total recovery. In a miscible flooding operation, miscible gasses such as carbon dioxide are injected into a primarily liquidous reservoir to mix with the liquids, lowering their viscosity and increasing pressure to improve the recovery rate.

Many oil producing countries are experiencing strong domestic growth in power demand and have an interest in enhanced oil recovery (EOR) to improve oil recovery from their reservoirs. Two common EOR techniques include nitrogen ($N_2$) injection for reservoir pressure maintenance and carbon dioxide ($CO_2$) injection for miscible flooding for EOR. There is also a global concern regarding green house gas (GHG) emissions. This concern combined with the implementation of cap-and-trade policies in many countries make reducing $CO_2$ emissions a priority for these and other countries as well as the companies that operate hydrocarbon production systems therein.

Some approaches to lower $CO_2$ emissions include fuel de-carbonization or post-combustion capture. However, both of these solutions are expensive and reduce power generation efficiency, resulting in lower power production, increased fuel demand and increased cost of electricity to meet domestic power demand. Another approach is an oxyfuel gas turbine in a combined cycle (e.g. where exhaust heat from the gas turbine Brayton cycle is captured to make steam and produce additional power in a Rankine cycle). However, there are no commercially available gas turbines that can operate in such a cycle and the power required to produce high purity oxygen significantly reduces the overall efficiency of the process. Several studies have compared these processes and show some of the advantages of each approach. See, e.g. BOLLAND, OLAV, and UNDRUM, HENRIETTE, *Removal of $CO_2$ from Gas Turbine Power Plants: Evaluation of pre- and post-combustion methods*, SINTEF Group, found at http://www.energy.sintef.no/publ/xergi/98/3/3art-8-engelsk.htm (1998).

U.S. Pat. No. 4,344,486 (the '486 patent) discloses a process of adding substantially pure oxygen to the produced hydrocarbons and carbon dioxide from a liquid producing formation to produce heat or power and re-injecting the carbon dioxide for EOR. The '486 patent discloses separating hydrocarbon liquids from gaseous constituents in a production stream of a liquid producing formation, then mixing the gaseous constituents with substantially pure oxygen and combusting the mixture to produce heat and $CO_2$. The $CO_2$ is then injected into the same or a different liquid producing formation. This approach fails to teach or suggest a solution to the efficiency drag from the oxygen plant.

U.S. Pat. Pub. No. 2007/0237696 (the '696 publication) discloses essentially a combination of the oxy-fuel process and EOR as disclosed in the '486 patent. The '696 publication also requires a stand-alone oxygen plant or air separation plant, and fails to teach or suggest a working gas power turbine configuration.

More recently International Patent Application no. US2009/038247 discloses a system that provides a solution to the efficiency drag from the oxygen plant and further provides an inert gas (nitrogen) injection for reservoir pressure maintenance. In the integrated system of US2009/038247, however, the net power produced is generally reduced by the power consumption requirement of the process even at the improved efficiency.

As such, there is still a substantial need for a low emission, high efficiency hydrocarbon recovery process with increased power production.

SUMMARY

An integrated system is provided in at least one embodiment of the present invention. The system includes an oxygen stream, a main control fuel stream, a main combustion unit, a first power generation system, and a second power generation system. The main combustion unit is configured to receive and combust the main control fuel stream and the oxygen stream to produce a gaseous combustion stream having carbon dioxide and water. The first power generation system is configured to receive the gaseous combustion stream and produce at least a compressed gaseous substantially carbon dioxide stream. The second power generation system is configured to receive thermal energy from the gaseous combustion stream and convert the thermal energy into at least one unit of power.

A method for low emission hydrocarbon recovery with power production is also provided in at least one embodiment of the present invention. The method includes the steps of generating a gaseous combustion stream having carbon dioxide and water; generating a compressed air stream; transferring heat from the gaseous combustion stream to the compressed air stream to form a cooled gaseous combustion stream and a heated compressed air stream; producing power, a water stream, and a carbon dioxide stream from the cooled gaseous combustion stream using a first power generation system; producing power from the heated compressed air stream using a second power generation system; and injecting at least a portion of the carbon dioxide stream into a reservoir to increase hydrocarbon production.

BRIEF DESCRIPTION OF THE DRAWINGS

The foregoing and other advantages of the present disclosure may become apparent upon reviewing the following detailed description and drawings of non-limiting examples of embodiments in which.

DETAILED DESCRIPTION

Definitions

Various terms as used herein are defined below. To the extent a term used in a claim is not defined below, it should be given the definition persons in the pertinent art have given that term.

As used herein, the "a" or "an" entity refers to one or more of that entity. As such, the terms "a" (or "an"), "one or more", and "at least one" can be used interchangeably herein unless a limit is specifically stated.

As used herein, the terms "comprising," "comprises," and "comprise" are open-ended transition terms used to transition from a subject recited before the term to one or more elements recited after the term, where the element or elements listed after the transition term are not necessarily the only elements that make up of the subject.

As used herein, the terms "containing," "contains," and "contain" have the same open-ended meaning as "comprising," "comprises," and "comprise."

As used herein, the terms "having," "has," and "have" have the same open-ended meaning as "comprising," "comprises," and "comprise."

As used herein, the terms "including," "includes," and "include" have the same open-ended meaning as "comprising," "comprises," and "comprise."

DESCRIPTION

In the following detailed description section, specific embodiments of the present invention are described in connection with preferred embodiments. However, to the extent that the following description is specific to a particular embodiment or a particular use of the present invention, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

Figure 1A:
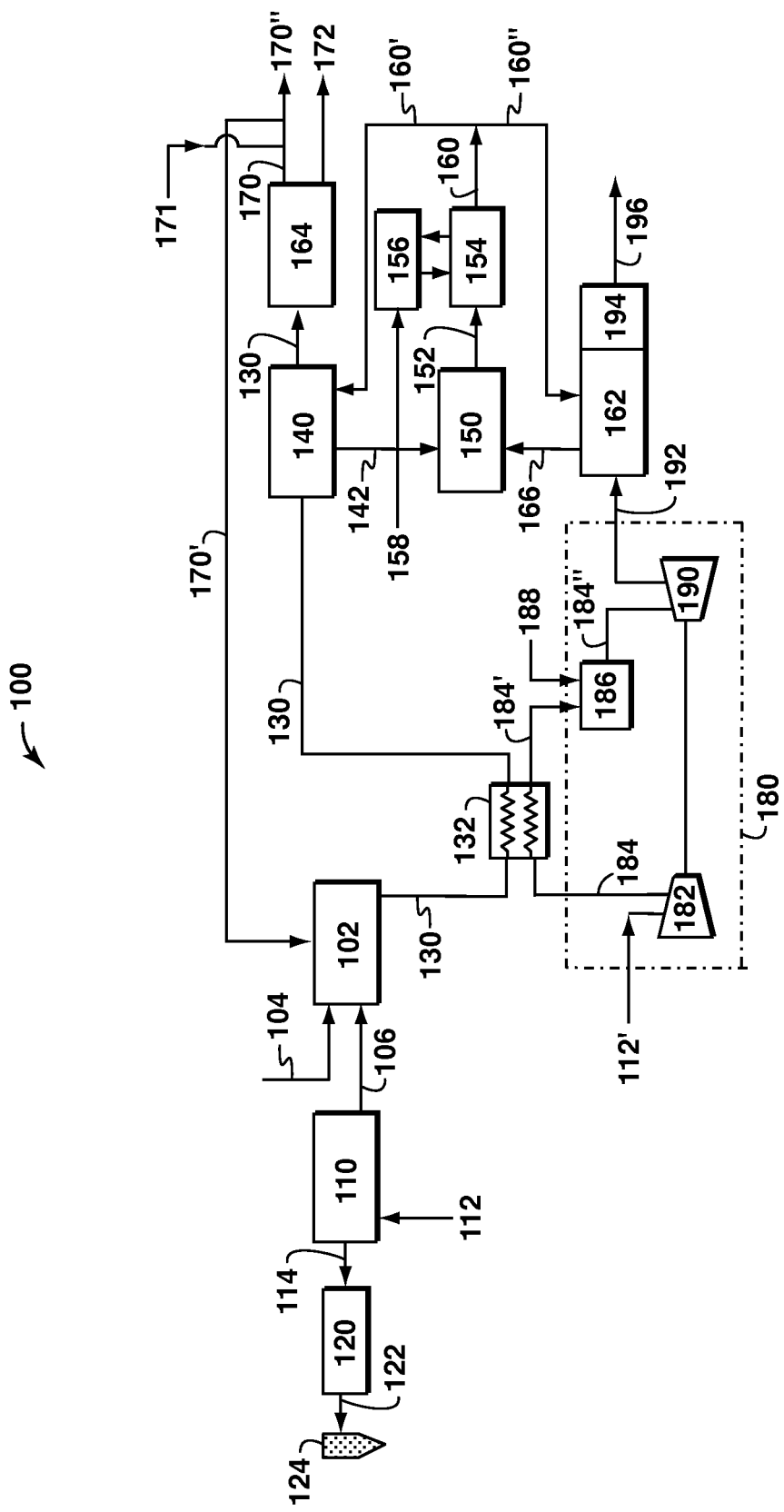
FIG. 1A illustrates an integrated systems for low emission power generation and hydrocarbon recovery according to an embodiment of the present disclosure.

With reference to FIG. 1A, an integrated system 100 is shown for a low emission, high efficiency hydrocarbon recovery process with increased excess power production. In general, the system 100 comprises two power-producing cycles coupled together synergistically to reduce overall emissions; produce $CO_2$ for enhanced oil recovery (EOR) or sequestration; produce $N_2$ for EOR, sequestration, or sale; produce clean water that may be used for domestic purposes; and/or the like. More specifically, the system 100 includes a main combustion unit (e.g., an oxy-fuel combustor) 102 configured to receive a main control fuel stream 104 and an oxygen stream 106. In at least one embodiment the oxygen stream 106 is generated by an Air Separation Unit ("ASU") 110 that is configured to separate an air stream 112 into a substantially oxygen enriched component (e.g., oxygen stream 106) and a substantially nitrogen enriched component (e.g., nitrogen stream 114). The nitrogen stream 114 may be compressed via a compressor 120 to generate a nitrogen injection stream 122 for subsequent injection into a pressure maintenance reservoir 124. However, the nitrogen stream 114 may be used in any appropriate application and/or sold to satisfy the design criteria of a particular application. It should also be appreciated that the oxygen stream 106 and the main control fuel stream 104 may be generated and/or supplied by any appropriate mechanism to satisfy the design criteria of a particular application. Furthermore, one or more embodiments may implement an air stream, which itself contains oxygen, as the oxygen stream 106.

Similarly, the main control fuel stream 104 may be any appropriate fuel or mixture of fuels (e.g., natural gas, coal, hydrocarbon liquid, and/or any other suitable carbonaceous fuel) to satisfy the design criteria of a particular application. In general, the main combustion unit 102 exhausts a mixture including carbon dioxide ($CO_2$) and water ($H_2O$) as a gaseous combustion stream 130.

The gaseous combustion stream 130 may be passed through a heat exchanger 132. The heat exchanger 132 is generally configured to transfer thermal energy from the gaseous combustion stream 130 to a gas turbine 180. As will be described later in the present application, the heat exchanger (i.e., heat exchange unit) 132 forms the interface between two power-producing cycles.

Having passed through the heat exchanger 132, the gaseous combustion stream 130 may be received by a first Heat Recovery Steam Generator (HRSG) 140. The first HRSG 140 generally includes a heat exchanger, such as a steam coil (not shown), in contact with the gaseous combustion stream 130 for generating steam 142. The steam 142 may be expanded across a steam turbine 150 to generate power/work. The steam turbine discharge stream 152 may then be condensed (e.g., in first condenser 154) and/or chilled (e.g., in chiller 156) to produce a water stream 160. In at least one embodiment, the chiller 156 is configured to receive a make-up water stream 158. All or a portion of the water 160, such as streams 160' and 160", may be circulated to an appropriate piece of equipment, such as the first 140 and/or a second 162 HRSG, and/or applied to any appropriate use to satisfy the design criteria of a particular application.

The first HRSG 140 may pass the gaseous combustion stream 130 to a second condenser 164 for separation into a compressed gaseous substantially $CO_2$ stream 170 and a water stream 172. In at least one embodiment, a portion 170' of the cooled $CO_2$ stream 170 may be recirculated back to the main combustion unit 102 to moderate combustion temperatures. In at least one other embodiment, a second portion 170" of the $CO_2$ stream 170 may be used in connection with EOR injection, sequestration, and/or any other suitable use. In yet another embodiment, exhaust gases 171 from at least one external source (not shown) may be mixed (i.e., combined) with the $CO_2$ stream 170 such that the exhaust gases 171 are also used in connection with combustion temperature moderation, EOR injection, sequestration, and/or any other suitable use.

Returning now to the heat exchange unit 132, the heat exchanger 132 of the system 100 generally acts to transfer thermal energy from the gaseous combustion stream 130 to a gas turbine 180 based power generating process. The gas turbine 180 generally receives an air stream, such as the air stream 112' which may be derived from the same source as air stream 112, and compresses the air stream, e.g. via compressor 182, to form a compressed turbine air stream 184. The heat exchanger 132 receives the compressed turbine air stream 184 and heats the air stream 184 via heat transfer between the gaseous combustion stream 130 and the stream 184. In the embodiment of FIG. 1A, the heated compressed turbine air stream 184' is then passed to a combustor (i.e., supplemental combustion unit) 186 that is coupled to an expander 190 for producing power/work from the combustor exhaust stream 184". In at least one embodiment the combustor 186 is configured to receive a fuel stream (i.e., supplemental control fuel stream) 188. The supplemental control fuel stream 188 may be any suitable fuel and/or fuel stream, such as but not limited to the main control fuel stream 104, to satisfy the design criteria of a particular application.

It may be noted that heating the compressed turbine air stream 184 in the heat exchange unit 132 may significantly reduce the amount of the supplemental control fuel 188 required to produce a desired air inlet temperature at the expander 190. Accordingly, the reduction in the amount of the supplemental control fuel stream 188 generally provides a reduction in the amount of emissions created by the supplemental combustion unit 186. Specifically, at least one simulation predicts that two-thirds of the emissions may be eliminated by using the heat exchanger unit 132 to heat the compressed turbine air stream 184 prior to combustion.

The gas turbine exhaust 192 may then pass to the second HRSG 162 or any other suitable device to satisfy the design criteria of a particular application. In at least one embodiment the second HRSG 162 is coupled to the steam turbine 150 and passes steam 166 to the steam turbine 150. The steam 166 may be combined with or used in place of the steam 142 to generate power and form the steam turbine discharge stream 152. In addition, one or more embodiments of the present invention may include a Selective Catalytic Reduction device (SCR) 194 coupled to the second HRSG 162 for processing stack gas 196 prior to release.

In at least one embodiment, the water content in the gaseous combustion stream 130 may be reduced by operating the main combustion unit 102 at an elevated pressure, as compared with the water content present in the combustion stream 130 when the main combustion unit 102 is operated near (i.e., slightly above, at, or slightly below) atmospheric pressure. In such an embodiment, the ASU 110 may be configured to provide a high pressure oxygen stream 106 to the main combustion unit 102.

In at least one embodiment, a reduction in the water content may allow for the elimination and/or simplification of one or more subsequent processing steps, such as the application of a dehydration unit (not shown). Similarly, operation of the main combustion unit 102 at an increased pressure may reduce the need to compress the generated $CO_2$ (e.g., the compressed gaseous substantially $CO_2$ stream 170). More specifically for subsequent use in, for example, EOR the amount of power required to compress the $CO_2$ derived from the combustion stream 130 to an appropriate reservoir injection level may be reduced by a factor of three. High pressure combustion equipment may also have a smaller physical footprint. In contrast, however, near atmospheric combustion generally avoids the need to compress the oxygen stream 106 and avoids the complications associated with high pressure combustion, such as the propensity to form soot.

Figure 1B:
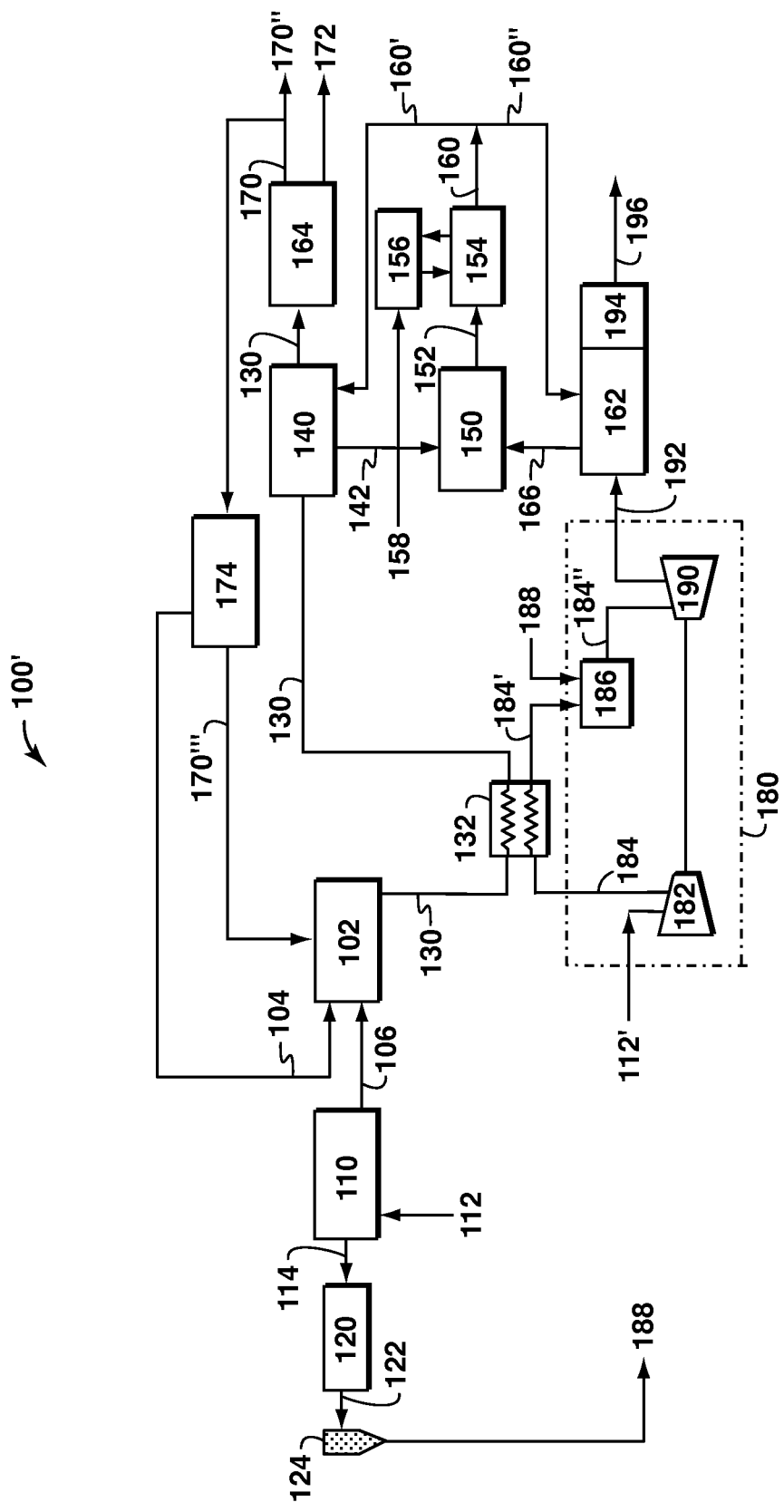
FIG. 1B illustrates an integrated systems for low emission power generation and hydrocarbon recovery according to another embodiment of the present disclosure.

Referring to FIG. 1B, a diagram illustrating another integrated system 100' that may be implemented in connection with the present invention is shown. In general the system 100' may be implemented similarly to the system 100 with the inclusion of a $CO_2$ reservoir 174 for injection of at least a portion of the compressed gaseous substantially $CO_2$ stream 170, such as stream 170'. As illustrated, a portion of the $CO_2$ stream 170, such as the stream 170''', may still be routed to the main combustion unit 102 for combustion temperature moderation. In addition or in the alternative, stream 170''' may be derived from (e.g., separated from) the fluids produced from reservoir 174. In at least one embodiment, the main control fuel stream 104 may be obtained from the $CO_2$ reservoir 174. Similarly, the supplemental control fuel stream 188 may be obtained from the pressure maintenance reservoir 124. It may be noted that the use of nitrogen in the fuel obtained from the pressure maintenance reservoir 124 may provide additional mass which may enhance the performance of the expander 190 and reduce the air compression requirement, thus increasing the net power of the gas turbine 180.

In at least one embodiment, the water stream 172 may be injected into a reservoir (e.g., 174) to enhance hydrocarbon recovery (e.g., EOR). In at least one other embodiment, the water stream 172 may be used in connection with well work, drilling, plant cooling, and/or steam systems. However, the water stream 172 may be implemented in connection with any appropriate use to satisfy the design criteria of a particular application. Furthermore, the water stream 172 may be characterized, or processed further such that it may be characterized, as low salinity water (i.e., water having total dissolved solids less than approximately 10,000 parts-per-million). Such low salinity water may be especially beneficial for reservoir water flooding as opposed to non-low salinity water. While the water stream 172 generally results from the process of combustion, water, such as low-salinity water, may be produced using any appropriate process to satisfy the design criteria of a particular embodiment.

Figure 1C:
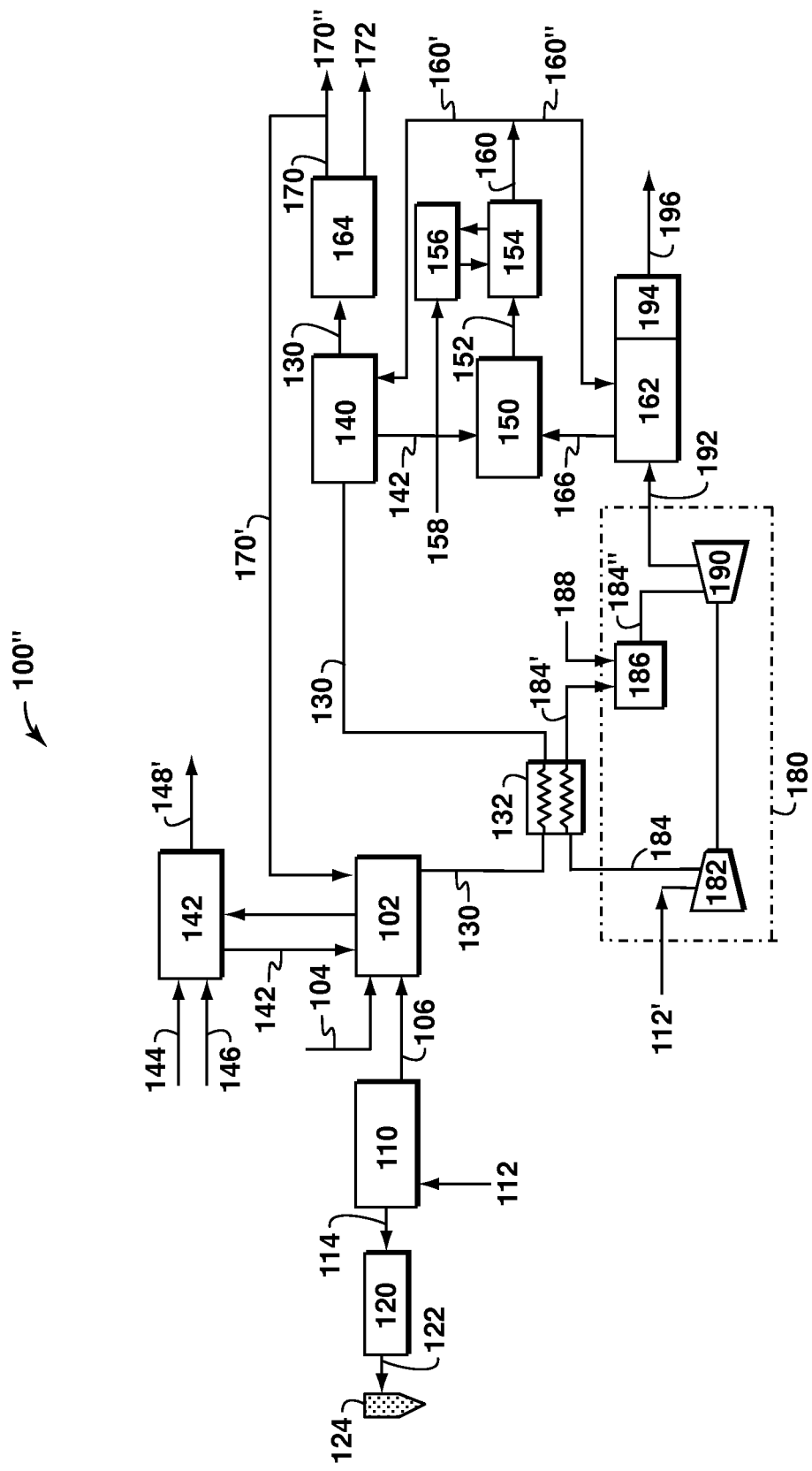
FIG. 1C illustrates an integrated systems for low emission power generation and hydrocarbon recovery according to yet another embodiment of the present disclosure.

Referring to FIG. 1C, a diagram illustrating yet another system 100" that may be implemented in connection with the present invention is shown. In general the system 100" may be implemented similarly to the systems 100 and 100' with the inclusion of a reformer 142 configured to receive a reformer fuel stream 144, such as the fuel stream 104 or 188, and a steam stream 146, such as the stream 142 or 166, and generate a hydrogen fuel stream 148. In general, the hydrogen fuel stream 148 may be implemented in the system 100" as the supplemental control fuel stream 188, and/or any other appropriate fuel stream. The use of hydrogen as a fuel generally eliminates or reduces the production of carbon dioxide in any resulting combustion stream. Thus the hydrogen fuel may be strategically or preferentially used in the combustion unit 186 of the Gas Turbine 180 to eliminate the carbon dioxide emissions that would otherwise result from using a carbonaceous fuel. This may be beneficial in attaining ultra-low emissions for system 100". In at least one embodiment, at least a portion of the hydrogen fuel stream 148, such as the portion 148', may be diverted for subsequent sale. It may be noted that the hydrogen fuel stream may, in one or more embodiments, also be implemented as the main control fuel stream 104. However, it may be undesirable to eliminate the carbon dioxide from gaseous combustion stream 130 as the carbon dioxide is generally separated and subsequently used for reservoir injection. It is contemplated, however, that a portion of the hydrogen fuel stream 148 and/or reformer effluent separated from the hydrogen stream may be implemented (e.g., mixed) with the main control fuel stream 104 to obtain a desirable (i.e., meets the design criteria of a particular application) combustion unit performance (e.g., flame stability) and/or carbon dioxide reduction in gaseous combustion stream 130.

Figure 2A:
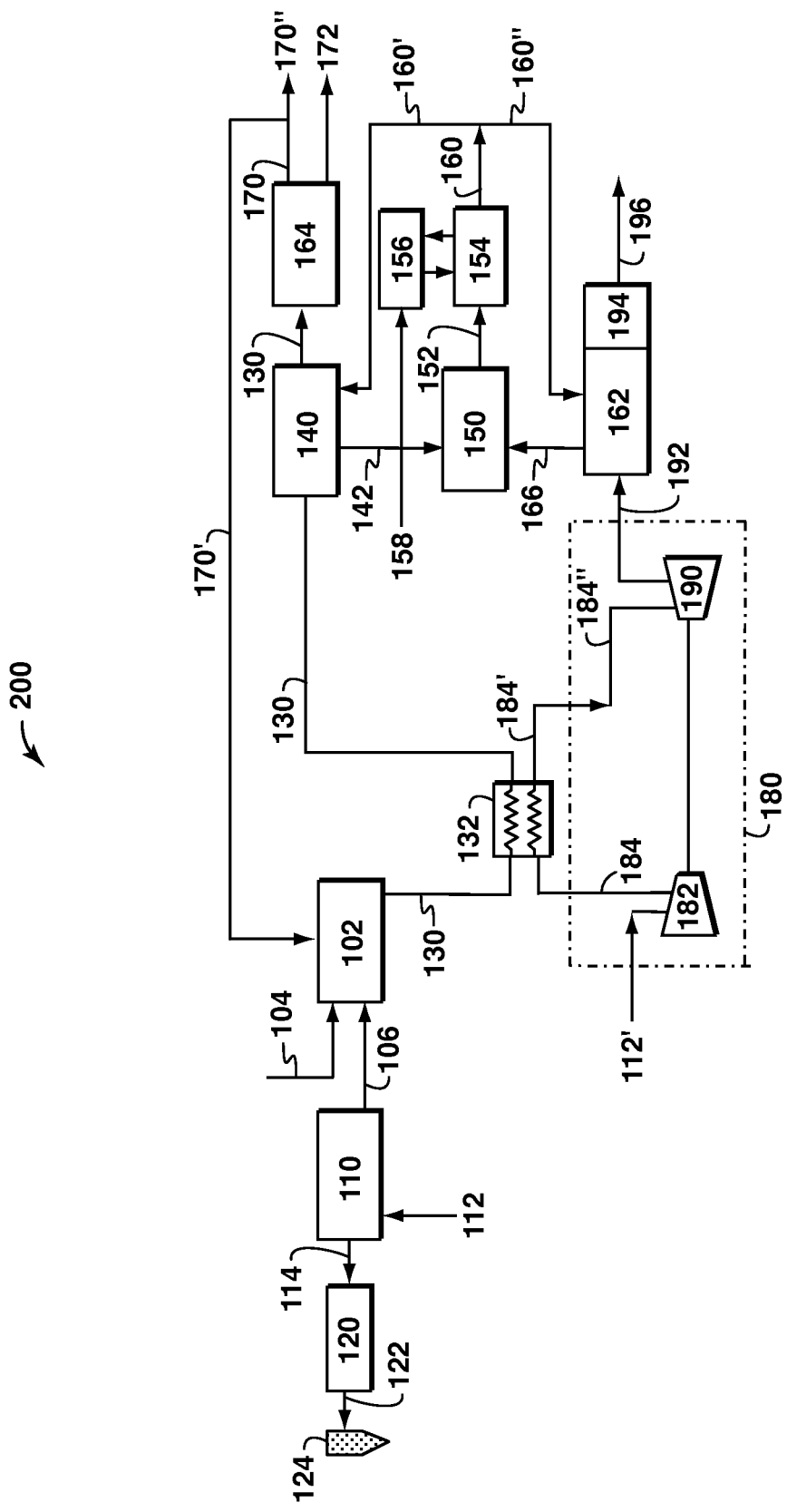
FIG. 2A illustrates an integrated systems for low emission power generation and hydrocarbon recovery according to still yet another embodiment of the present disclosure.

Referring, now, to FIG. 2A, an integrated system 200 is shown for a low emission, high efficiency hydrocarbon recovery process with excess power production. The system 200 may be implemented similarly to the systems 100, 100' and 100" with the exception that the supplemental combustion unit 186 is omitted. Accordingly, the heated compressed turbine air stream 184' is passed directly to the expander 190. Elimination of the supplemental combustion unit 186 and the associated combustion exhaust may be beneficial, for example, in reaching ultra-low emissions. In such an embodiment, the heated compressed turbine air stream 184' may reach the expander 190 at a temperature substantially less than the preferred (e.g., maximum) operating inlet temperature, as specified by a manufacturer, of the expander 190. The reduced temperature generally reduces the overall power generated by the system 200 in exchange for a reduction in the complexity of the system 200 and reduced emissions. In contrast, inclusion of the supplemental combustion unit 186 generally provides the expander 190 with an air stream 184" at a temperature substantially equal to the preferred (e.g., maximum) operating inlet temperature of the expander 190. The inclusion of the supplemental combustion unit 186 generally yields additional power but may also complicate the design of the system 200 and increase emissions associated with system 200. It may be noted that use of a ceramic heat exchanger for element 132 may provide sufficient heat transfer such that the heated compressed turbine air 184' reaches the expander 190 substantially at the preferred operating (e.g., maximum) inlet temperature of the expander 190. The additional heat may yield additional power while elimination of the supplemental combustion unit 186 may provide a reduction in the overall emissions of the system 200 (e.g., those emissions associated with the supplemental combustion unit 186). It may also be noted that elimination of the supplemental combustion unit 186 generally eliminates the need for the SCR 194.

Figure 2B:
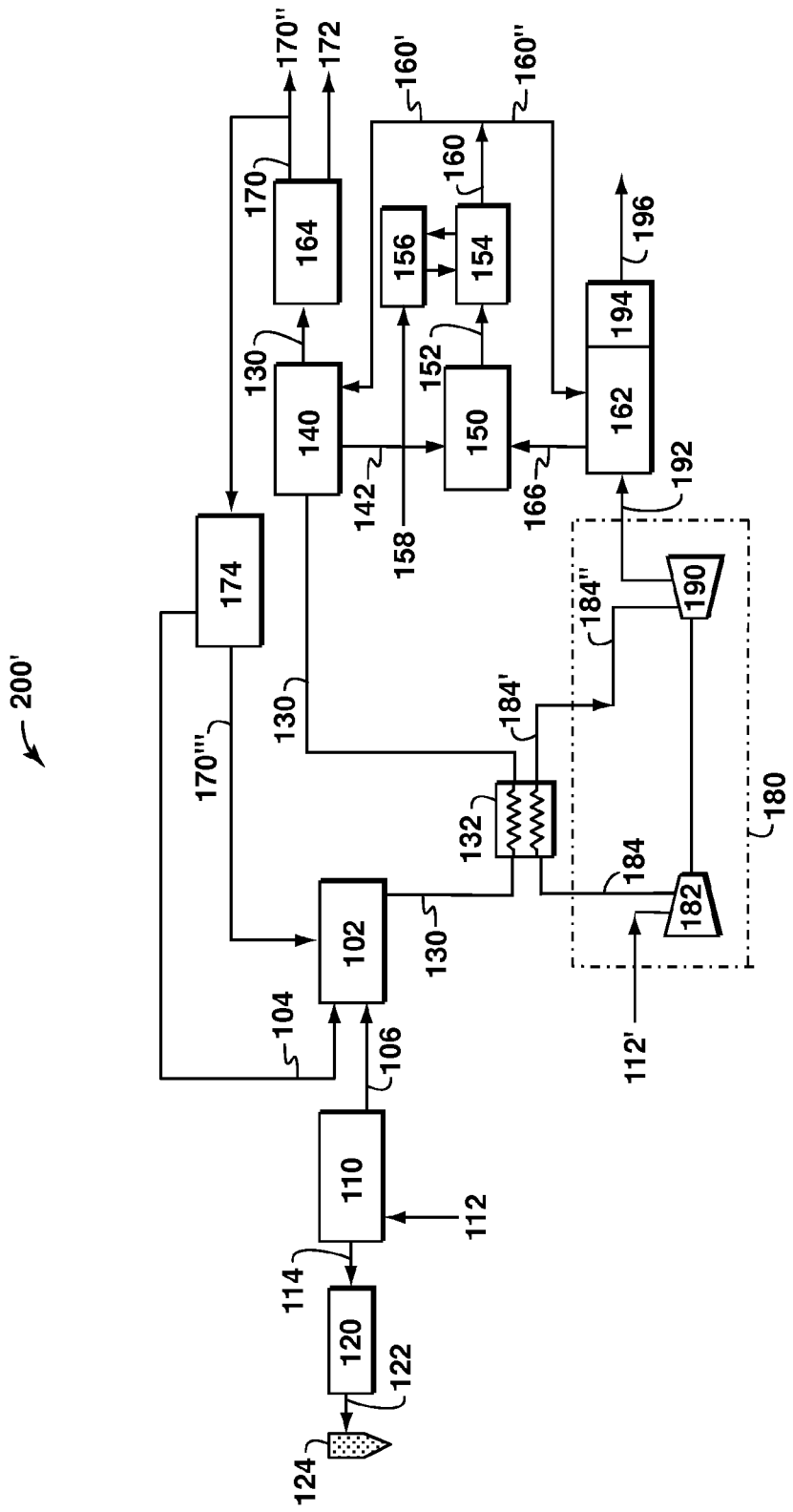
FIG. 2B illustrates an integrated systems for low emission power generation and hydrocarbon recovery according to yet another embodiment of the present disclosure.

Referring to FIG. 2B, a diagram illustrating another integrated system 200' that may be implemented in connection with the present invention is shown. In general the system 200' may be implemented similarly to the system 200 with the inclusion of a $CO_2$ reservoir 174 for injection of at least a portion of the compressed gaseous substantially $CO_2$ stream 170, such as stream 170'. As illustrated, a portion of the $CO_2$ stream 170, such as the stream 170''', may be routed to the main combustion unit 102 for combustion temperature moderation. In addition or in the alternative, stream 170''' may be derived from (e.g., separated from) the fluids produced from reservoir 174. In at least one embodiment, the main control fuel stream 104 may be obtained from the $CO_2$ reservoir 174. Again, as with systems 100, 100', 100" and 200, the nitrogen stream 114 from an associated ASU 110 may be compressed via a compressor 120 to generate a nitrogen injection stream 122. The nitrogen stream 122 may be used for subsequent injection into a pressure maintenance reservoir 124, or the nitrogen stream 114/122 may be used in any appropriate application and/or sold to satisfy the design criteria of a particular application.

TABLE 1, below, provides a simulated performance comparison between the systems 200 and 200' and a conventional Natural Gas Combined Cycle (NGCC).

TABLE 1

Example Performance Comparison

| | NGCC with Carbon Capture | System of FIGS. 2A-B |
|---|---|---|
| Gas Turbine Power (MW) | 361 | 370 |
| Steam Turbine Generator Power (MW) | 206 | 365 |
| Auxiliary Loads (MW) | 114 | 112 |
| Net Power (MW) | 453 | 622 |
| Fuel Usage (mmscfd) | 86.6 | 120.8 |
| CO2 Produced (mmscfd) | 85.7 | 119.9 |
| Heat Rate | 7968 | 8096 |
| LHV efficiency | 42.8 | 42.1 |

Figure 3:
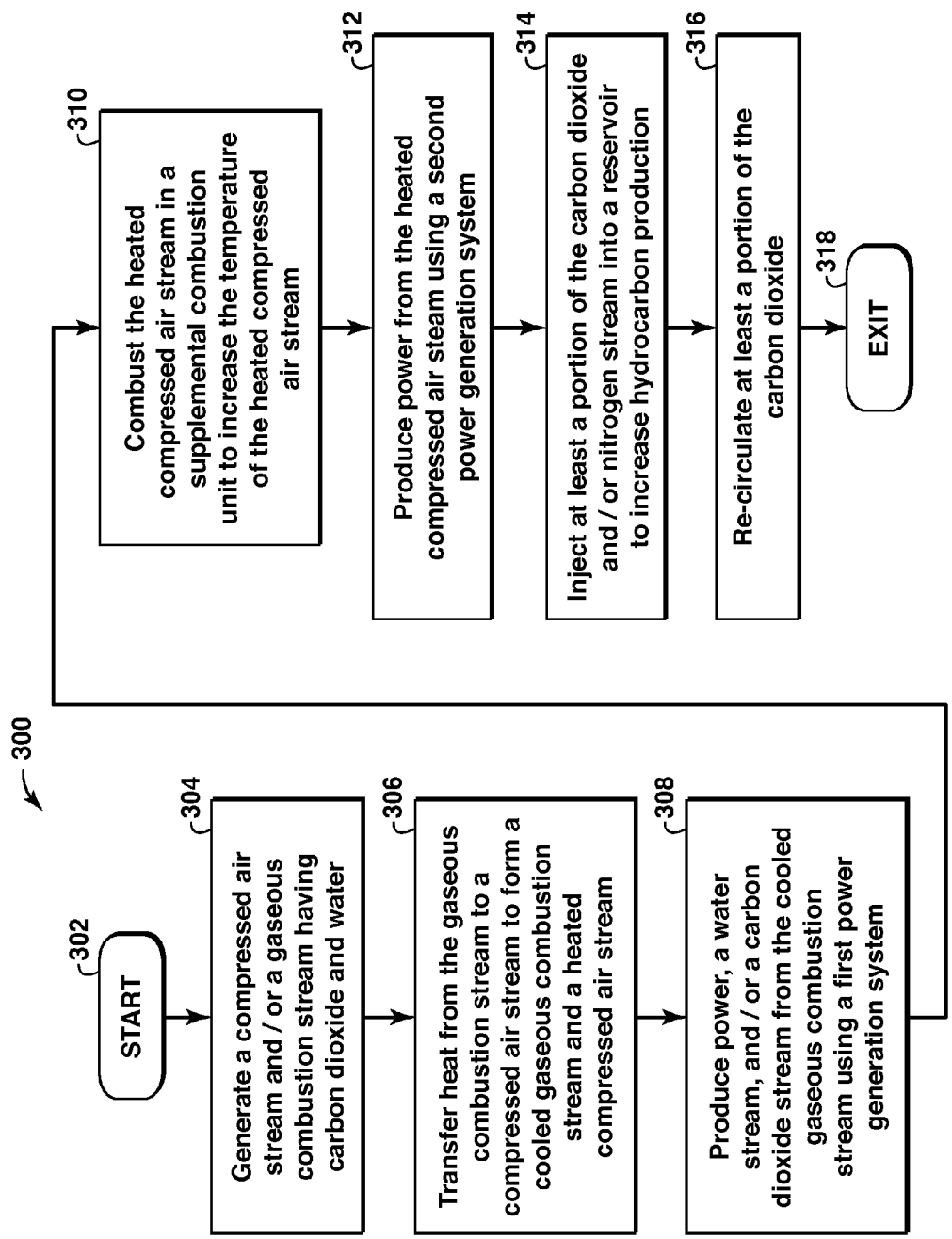
FIG. 3 illustrates a flow diagram of a method for low emission power generation and hydrocarbon recovery according to an embodiment of the present disclosure.

Referring to FIG. 3, a flow diagram of a method 300 for low emission hydrocarbon recovery with power generation according to one embodiment is shown. The method 300 may be advantageously implemented in connection with the system 100, 100', 100", 200 and/or 200' described previously in connection with FIGS. 1A-1C, FIGS. 2A-2B, and/or any appropriate system to meet the design criteria of a particular application. The method 300 generally includes a plurality of blocks or steps (e.g., 302, 304, 306, etc.) that may be performed serially. As will be appreciated by one of ordinary skill in the art, the order of the steps shown in FIG. 3 is exemplary and the order of one or more steps may be modified within the spirit and scope of the present invention. Additionally, the steps of the method 300 may be performed in at least one non-serial (or non-sequential) order, and one or more steps may be omitted to satisfy the design criteria of a particular application.

Block 302 is an entry point into the method 300. At block 304 a gaseous combustion stream (e.g., 130) and a compressed air stream (e.g. 184) may be generated. In at least one embodiment an oxygen stream (e.g., 106) from an ASU (e.g., 110) is implemented in conjunction with a combustion unit (e.g., 102) and a fuel stream (e.g., 104) to generate the gaseous combustion stream. In such an embodiment, the gaseous combustion stream generally includes carbon dioxide and water. The carbon dioxide along with nitrogen generated as a byproduct in the ASU may be compressed and/or injected into a reservoir (e.g., 124, 174) to facilitate hydrocarbon production. However, the gaseous combustion stream and/or the compressed air stream may be generated using any appropriate mechanism to satisfy the design criteria of a particular application.

At block 306 heat is transferred from the gaseous combustion stream to the compressed air stream. The heat transfer generally results in a cooled gaseous combustion stream and a heated compressed air stream. In at least one embodiment the heat is transferred using a heat exchange unit (e.g., 132) which may be any appropriate material and/or device capable of exchanging heat at high temperatures such as ceramic matrix composites (CMC), ceramic air-to-air heat exchangers, compact plate-fin ceramic recuperators and other metallic alloys such as Inconel for low pressure application and various oxide dispersion strengthened (ODS) alloys. Various coatings, such as Thermal Barrier Coatings (TBCs) and Environmental Barrier Coatings (EBCs) may also be used for these applications. Specific examples of potentially suitable heat exchange units are Heatric (a Division of Meggitt Corporation) high-temperature heat exchangers (PCHE, FPHE, $H^2X$) made from diffusion-bonding process and using specialty alloys such as Inconel 617 to enable operation at very high process temperatures. However, the heat may be transferred using any appropriate device and/or material to satisfy the design requirements of a particular application.

At block 308 a first power generation system which, in at least one embodiment, may include a HRSG (e.g., 140), a steam turbine (e.g., 150), a first condenser (e.g., 154), a chiller (e.g., 156), and/or a second condenser (e.g., 164) is generally implemented to receive the cooled gaseous combustion stream and produce at least one unit of power/work, a water stream (e.g., 160, 172) and/or a compressed gaseous substantially $CO_2$ stream (e.g., 170).

At block 310 the heated compressed air stream may, if desired to satisfy a design criteria, be heated even further via a supplemental combustion unit (e.g., 186). In at least one embodiment a reformer unit (e.g., 142) may be implemented to generate hydrogen for subsequent use as a fuel stream (e.g., supplemental control fuel stream 188) to the supplemental combustion unit. In such an embodiment, the gaseous combustion stream of the supplemental combustion unit may be substantially devoid of carbon dioxide. As such, use of a reformer unit may provide a significant reduction in undesirable combustion related emissions.

At block 312 a second power generation system which may, for example, comprise a conventional Natural Gas Combined Cycle (NGCC) process modified for full air extraction, may be implemented to generate at least one unit of power/work. In at least one embodiment, the second power generation system may include a gas turbine (e.g., 180) a HRSG (e.g., 162), a steam turbine (e.g., 150), a first condenser (e.g., 154), a chiller (e.g., 156), and/or a SCR (e.g., 194) as illustrated, for example, in the exemplary integrated system 100 of FIG. 1A and/or 200 of FIG. 2A.

At block 314 at least a portion of any generated carbon dioxide stream (e.g., 170") may be injected into a reservoir to increase hydrocarbon production (e.g., EOR). Similarly, at least a portion of the nitrogen produced (e.g., 114) may be injected into a reservoir to increase hydrocarbon production (e.g., through pressure maintenance).

At block 316 at least a portion of any generated carbon dioxide stream (e.g., 170') may be re-circulated to a suitable device such as a combustion unit to, for example, moderate combustion temperatures. Block 318 generally represents an exit point out of the method 300.

As may be appreciated, then, the disclosed system and methods generally provide a low emission, high efficiency hydrocarbon recovery process with increased power production. Furthermore, in one or more embodiments, the main combustor (e.g., 102) may be designed to handle low BTU-fuel with high $CO_2$ contamination such as would typically be found in the gas of an EOR project after $CO_2$ breakthrough. In one or more such embodiments, hydrogen may be added to the low BTU-fuel to assist with flame stability.

While the present invention may be susceptible to various modifications and alternative forms, the exemplary embodiments discussed above have been shown only by way of example. However, it should again be understood that the invention is not intended to be limited to the particular embodiments disclosed herein. Indeed, the present invention includes all alternatives, modifications, and equivalents falling within the true spirit and scope of the appended claims.

What is claimed is:

1. An integrated system, comprising:
a main combustion unit configured to receive and combust a main control fuel stream and an oxygen stream to produce a gaseous combustion stream having carbon dioxide and water;
a first power generation system configured to receive the gaseous combustion stream and produce at least a compressed gaseous substantially carbon dioxide stream;
a second power generation system configured to receive thermal energy from the gaseous combustion stream and convert the thermal energy into at least one unit of power;
a heat exchange unit configured to receive the gaseous combustion stream, extract the thermal energy from the gaseous combustion stream, and transfer the thermal energy to the second power generation system,
wherein the heat exchange unit transfers the thermal energy to a compressed turbine air stream of the second power generation system to form a heated compressed turbine air stream; and
an air separation unit configured to generate the oxygen stream and to generate a nitrogen stream,
wherein at least a portion of the nitrogen stream is injected into a pressure maintenance reservoir, and
at least a portion of the compressed gaseous substantially carbon dioxide stream is injected into a hydrocarbon reservoir.

2. The system of claim 1 wherein the second power generation system further includes a supplemental combustion unit configured to receive the heated compressed turbine air stream, receive a supplemental control fuel stream, and combust the heated compressed turbine air stream with the supplemental control fuel stream to form a combustor exhaust stream.

3. The system of claim 2 further including an expander for receiving the combustor exhaust stream, wherein the supplemental combustion unit is configured to provide the combustor exhaust stream to the expander at a temperature substantially equal to a preferred operating inlet temperature of the expander.

4. The system of claim 2 further including an expander for receiving the combustor exhaust stream, wherein the supplemental combustion unit is configured to provide the combustor exhaust stream to the expander at a temperature less than a preferred operating inlet temperature of the expander.

5. The system of claim 2 wherein the main control fuel stream and the supplemental control fuel stream are supplied by a single shared fuel source.

6. The system of claim 2 further including a reformer configured to receive steam and a reaction fuel source and further configured to generate hydrogen, wherein at least a portion of the hydrogen is used for the supplemental control fuel stream.

7. The system of claim 6 wherein another portion of the hydrogen is captured for resale.

8. The system of claim 1 further including a reformer configured to receive steam and a reaction fuel source and further configured to generate hydrogen, wherein at least a portion of reformer products, the hydrogen, or both is used for the main control fuel stream.

9. The system of claim 1 wherein the oxygen stream is pressurized prior to combustion in the main combustion unit.

10. The system of claim 1 wherein the pressure of the oxygen stream is substantially equal to atmospheric pressure when the oxygen stream is received by the main combustion unit.

11. The system of claim 1 wherein the second power generation system includes a supplemental combustion unit configured to receive a supplemental control fuel stream and the supplemental control fuel stream is produced from the pressure maintenance reservoir.

12. The system of claim 1 wherein at least a portion of the compressed gaseous substantially carbon dioxide stream is recirculated back to the main combustion unit.

13. The system of claim 12 wherein an exhaust gas from at least one external source is mixed with the compressed gaseous substantially carbon dioxide stream.

14. The system of claim 1 wherein the main control fuel stream is produced from the hydrocarbon reservoir.

15. The system of claim 1 wherein an exhaust gas from at least one external source is mixed with the compressed gaseous substantially carbon dioxide stream.

16. The system of claim 1 wherein the second power generation system includes:
a compressor configured to receive an air source and generate a compressed turbine air stream; and
an expander configured to receive the heated compressed turbine air stream and generate a gas turbine exhaust.

17. The system of claim 1 wherein the heat exchange unit is a ceramic heat exchanger and the heated compressed turbine air stream is at a temperature substantially equal to a preferred operating inlet temperature of the expander.

18. The system of claim 16 wherein the heated compressed turbine air stream is at a temperature substantially less than a preferred operating inlet temperature of the expander.

19. The system of claim 16 further including a supplemental combustion unit configured to receive the heated compressed turbine air stream from the heat exchange unit, and increase the temperature of the heated compressed turbine air stream through combustion of a supplemental control fuel stream.

20. The system of claim 1 wherein a water stream is produced from the water of the gaseous combustion stream and the water stream is injected into a reservoir to enhance hydrocarbon recovery.

21. The system of claim 20 wherein the water stream is a low-salinity water stream.

22. The system of claim 1 wherein a water stream is produced from the water of the gaseous combustion stream and the water stream is used in connection with at least one of well work, drilling, plant cooling, and a steam system.

23. The system of claim 1 wherein the oxygen stream comprises air.

24. A method for low emission hydrocarbon recovery with power production, the method comprising the steps of:
generating a gaseous combustion stream having carbon dioxide and water;
generating a compressed air stream;
transferring heat from the gaseous combustion stream to the compressed air stream to form a cooled gaseous combustion stream and a heated compressed air stream;
producing power, a water stream, and a carbon dioxide stream from the cooled gaseous combustion stream using a first power generation system;
producing power from the heated compressed air stream using a second power generation system, wherein the producing power using the second power generation system includes
using a heat exchange unit that receives the gaseous combustion stream to extract the thermal energy from the gaseous combustion stream, and
transferring the thermal energy to a compressed turbine air stream of the second power generation system to form a heated compressed turbine air stream;
injecting at least a portion of the carbon dioxide stream into a hydrocarbon reservoir to increase hydrocarbon production; and
injecting at least a portion of a nitrogen stream into a pressure maintenance reservoir.

25. The method of claim 24 further including the step of increasing the temperature of the heated compressed air stream prior to producing power from the second power generation system.

26. The method of claim 25 wherein the temperature of the heated compressed air stream is increased using a supplemental combustion unit.

27. The method of claim 26 wherein the supplemental combustion unit is configured to receive and combust a hydrogen fuel source produced by a reformer.

28. The method of claim 24 wherein the gaseous combustion stream having carbon dioxide and water is generated by a main combustion unit combusting a mixture of oxygen and fuel.

29. The method of claim 28 wherein the oxygen is generated by an Air Separation Unit.

30. The method of claim 28 wherein the oxygen is provided as air.

31. The method of claim 28 further including the step of re-circulating at least a portion of the carbon dioxide stream to the main combustion unit to moderate combustion temperature in the main combustion unit.

32. The method of claim 1, wherein the hydrocarbon reservoir and the pressure maintenance reservoir are different.

* * * * *